US009912881B2

(12) United States Patent
Kawanabe et al.

(10) Patent No.: US 9,912,881 B2
(45) Date of Patent: Mar. 6, 2018

(54) APPARATUS, SYSTEM, AND METHOD OF CONTROLLING APPARATUS

(71) Applicant: CANON KABUSHIKI KAISHA, Tokyo (JP)

(72) Inventors: Jun Kawanabe, Kumagaya (JP); Minoru Watanabe, Honjo (JP); Keigo Yokoyama, Honjo (JP); Masato Ofuji, Takasaki (JP); Kentaro Fujiyoshi, Tokyo (JP); Hiroshi Wayama, Honjo (JP); Kazuya Furumoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,609

(22) Filed: Dec. 7, 2015

(65) Prior Publication Data

US 2016/0161615 A1 Jun. 9, 2016

(30) Foreign Application Priority Data

Dec. 9, 2014 (JP) .................................. 2014-249427
Dec. 9, 2014 (JP) .................................. 2014-249428
Feb. 9, 2015 (JP) .................................. 2015-023715

(51) Int. Cl.
*G01T 1/02* (2006.01)
*H04N 5/32* (2006.01)

(52) U.S. Cl.
CPC ...................................... *H04N 5/32* (2013.01)

(58) Field of Classification Search
CPC ......... H01L 27/14663; H01L 27/14612; G01T 1/02; G01T 1/026; G01T 1/247
See application file for complete search history.

(56) References Cited

U.S. PATENT DOCUMENTS

| 2002/0093581 A1* | 7/2002 | Ikeda | H04N 5/357 348/302 |
| 2012/0049077 A1* | 3/2012 | Okada | H01L 27/14603 250/370.08 |
| 2012/0318999 A1* | 12/2012 | Sato | G01T 7/005 250/395 |
| 2013/0170620 A1* | 7/2013 | Tredwell | G01T 1/2018 378/91 |

(Continued)

FOREIGN PATENT DOCUMENTS

JP 2012-15913 A 1/2012

*Primary Examiner* — Marcus Taningco
(74) *Attorney, Agent, or Firm* — Canon USA, Inc., IP Division

(57) ABSTRACT

An apparatus includes a detecting pixel including a converting element and a switch element, a different pixel includes a different converting element and a different switch element, a signal line connected in common to a plurality of the switch elements, a driving unit configured to drive the different switch element and the switch element, and a control unit configured to control the driving unit, wherein the control unit controls the driving unit such that in a case where an on-state voltage or an off-state voltage is applied to at least one switch element, a voltage of opposite polarity to the on-state voltage or the off-state voltage is applied to a different switch element that is different from the at least one switch element or a voltage of opposite polarity to the on-state voltage or the off-state voltage is applied to the different switch element.

26 Claims, 20 Drawing Sheets

(56) References Cited

U.S. PATENT DOCUMENTS

2014/0241506 A1* 8/2014 Iwashita ............... H04N 5/32
                                                  378/91
2015/0160352 A1* 6/2015 Tredwell ............... G01T 1/175
                                                  378/98.8

* cited by examiner

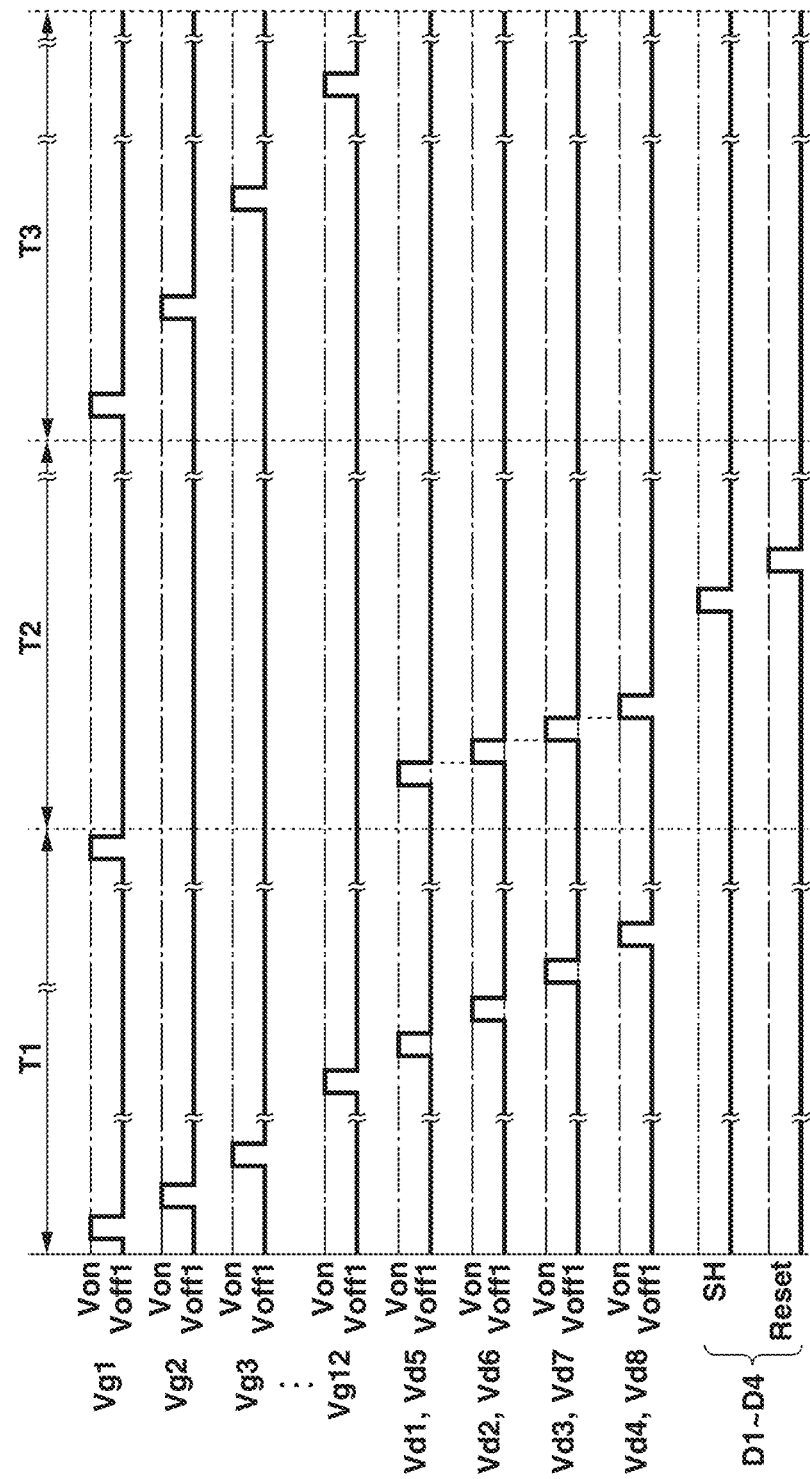

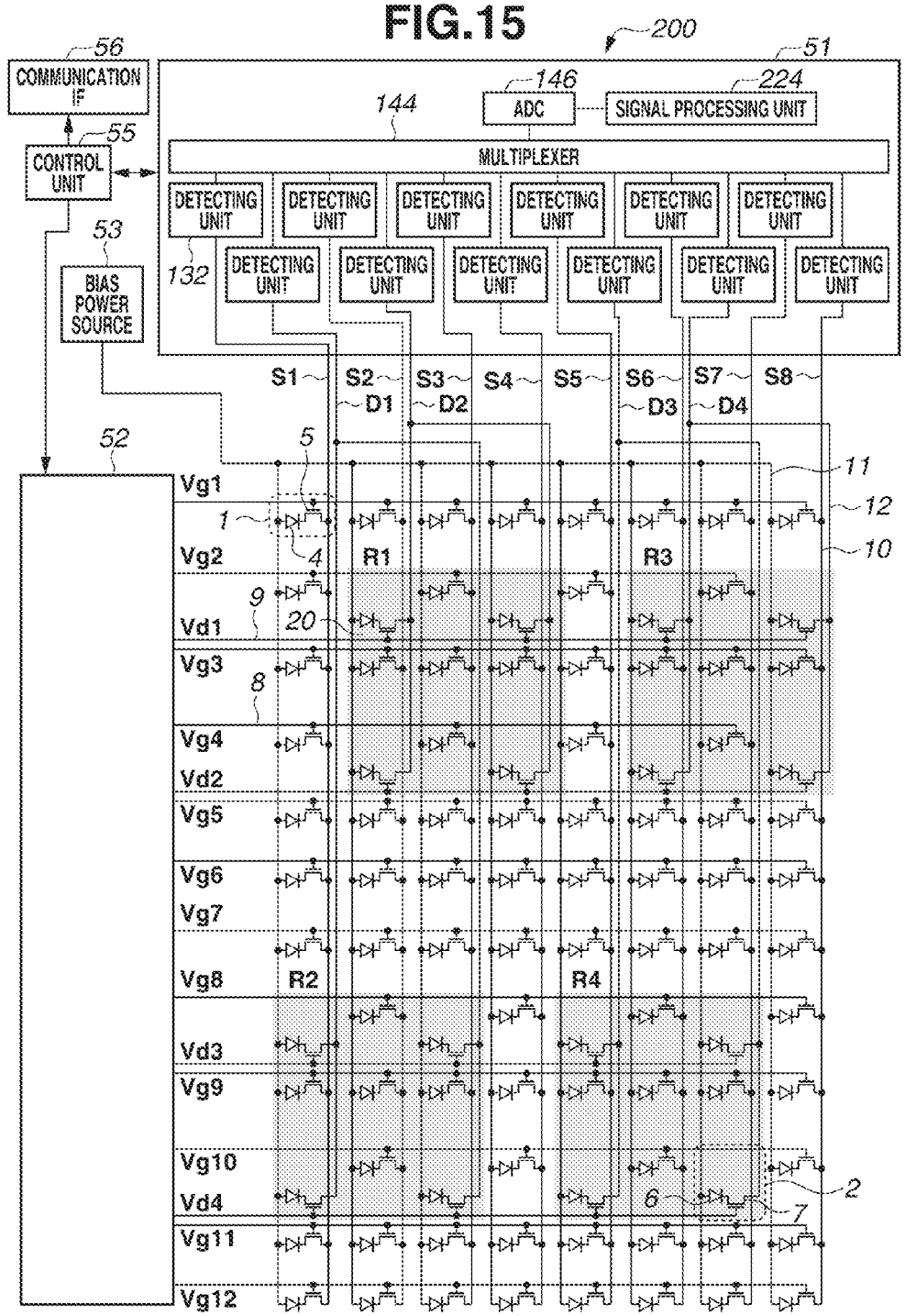

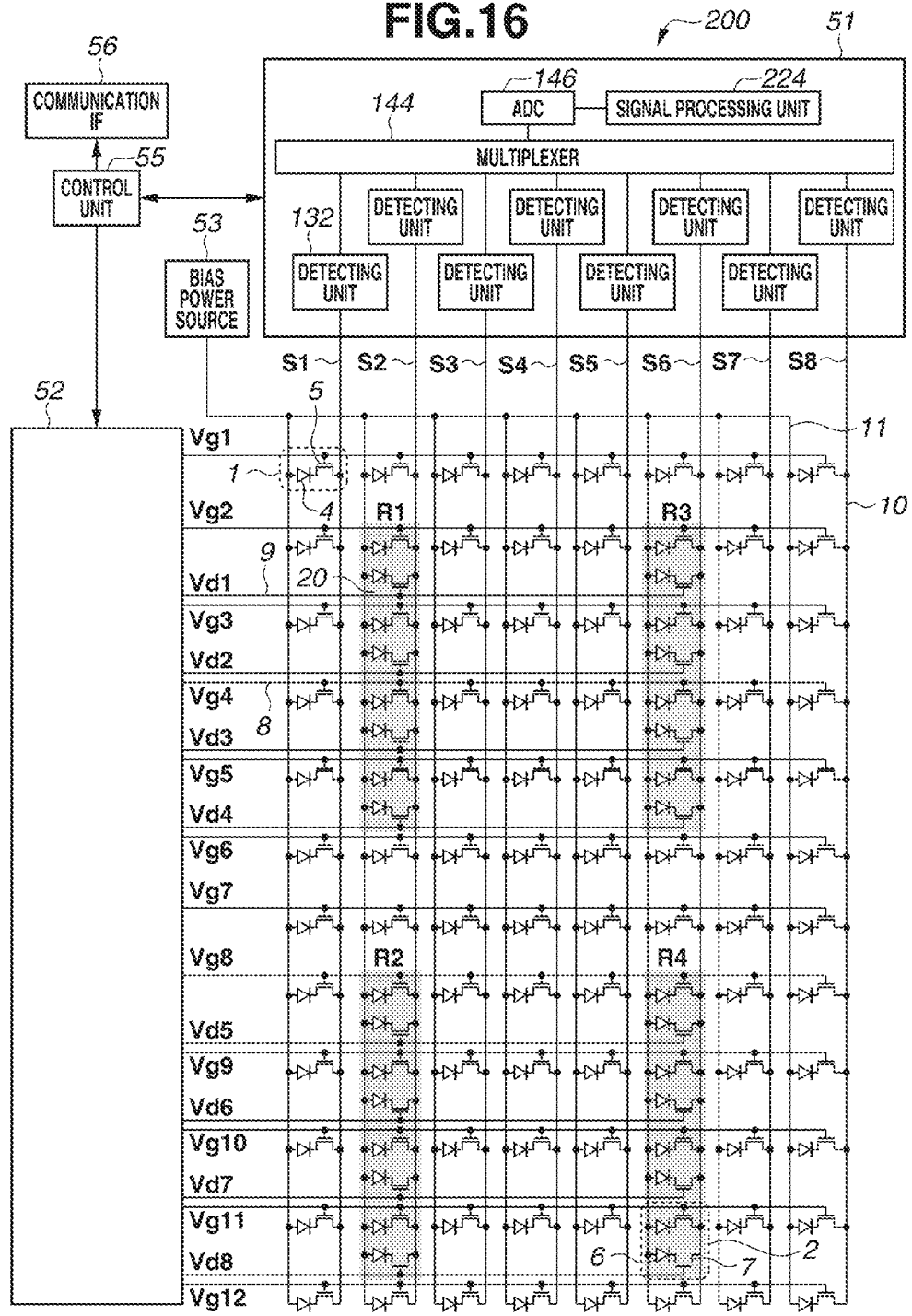

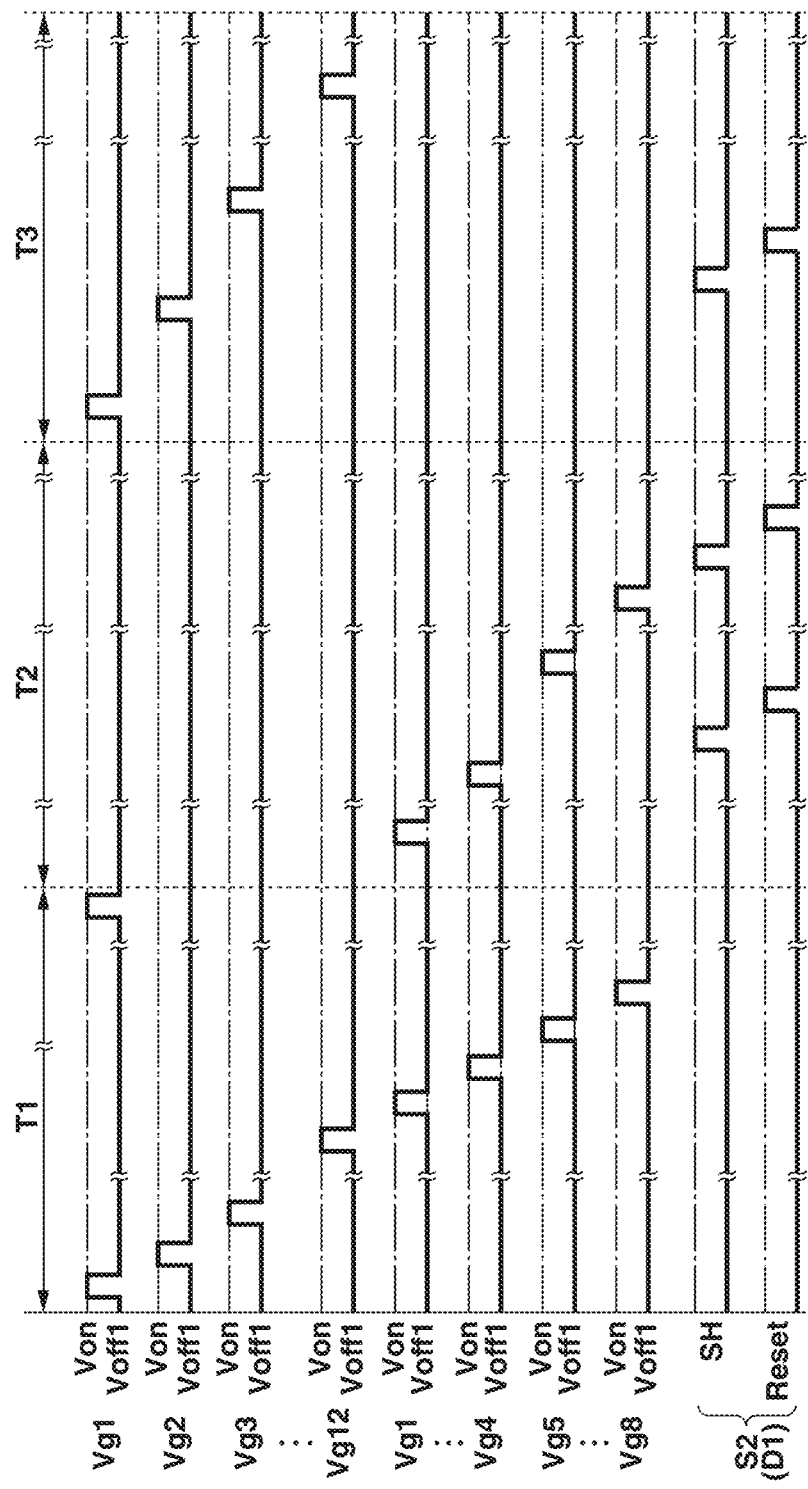

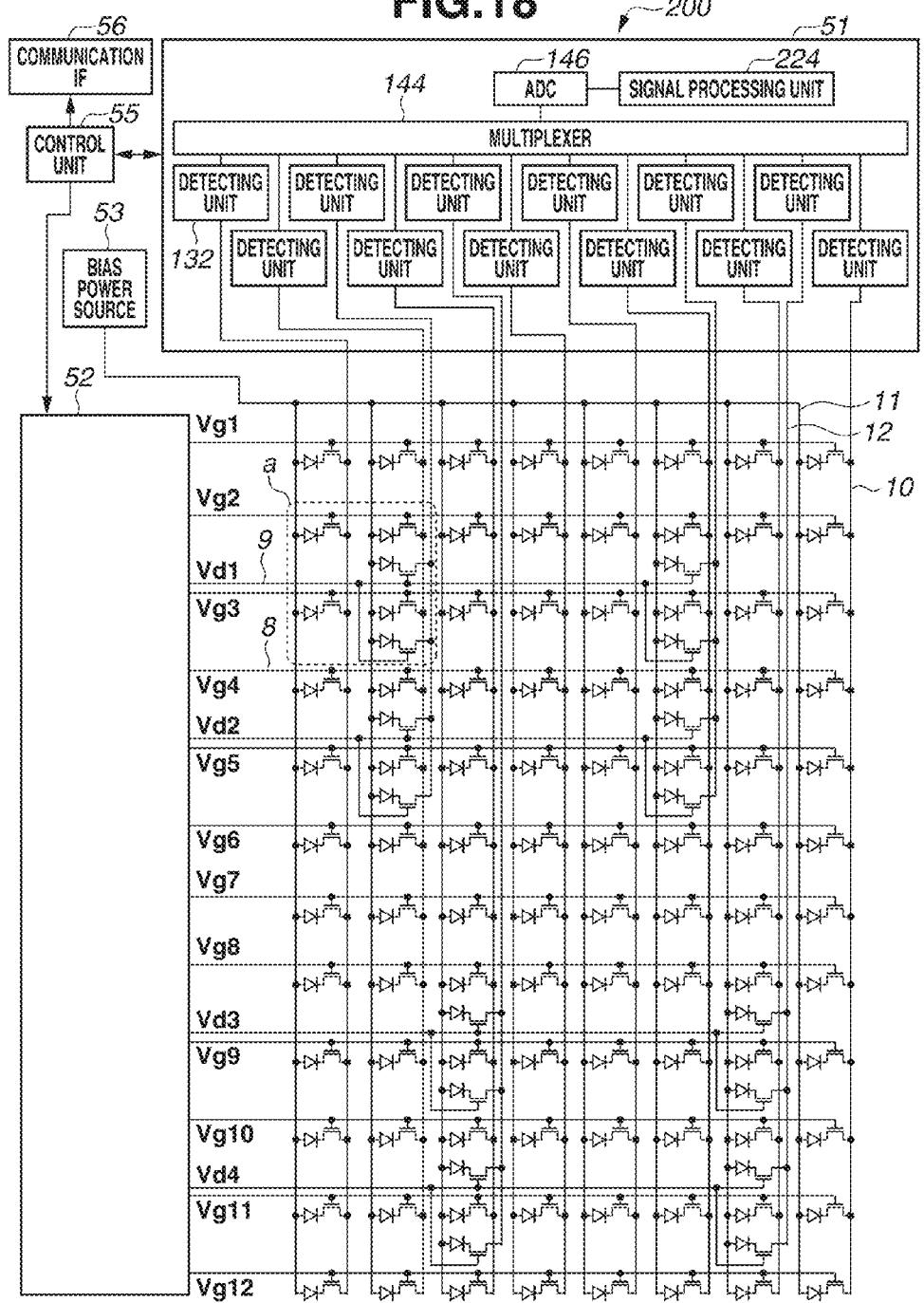

APPARATUS, SYSTEM, AND METHOD OF CONTROLLING APPARATUS

BACKGROUND OF THE INVENTION

Field of the Invention

The present invention relates to radiation imaging apparatuses, radiation imaging systems, and a method for controlling the radiation imaging apparatus.

Description of the Related Art

Radiation imaging apparatuses including a matrix substrate including pixel arrays having a combination of switches, such as thin-film transistors (TFTs) or the like, and converting elements, such as photoelectrical converting elements or the like, have been put into practical use as radiation imaging apparatuses for use in medical imaging diagnosis and non-destructive tests using radiation, such as X-rays, etc.

In recent years, it has been studied to increase the functions of radiation imaging apparatuses. An example is to include a function for monitoring irradiation of radiation. This function enables, for example, detection of timing at which the irradiation of radiation from a radiation source is started, detection of timing at which the irradiation of radiation is to be stopped, and detection of the dose of radiation or the integrated dose of radiation.

Japanese Patent Application Laid-Open No. 2012-15913 discusses a radiation imaging apparatus including image capturing pixels for acquisition of radiation images and detecting pixels for detection of radiation. Further, Japanese Patent Application Laid-Open No. 2012-15913 discusses an arrangement in which signals for detecting radiation are read via switch elements connected to the detecting pixels. Further, Japanese Patent Application Laid-Open No. 2012-15913 discusses an arrangement in which a driving voltage is switched as appropriate between a conductive voltage and a non-conductive voltage in order that the conductive state of the switch elements is switched at the time of reading the signals of pixels for detection.

However, in the radiation imaging apparatus discussed in Japanese Patent Application Laid-Open No. 2012-15913, the electrical potential of the signal lines may change at the time of switching the driving voltage due to parasitic elements (parasitic capacitances) between control lines and the signal lines connected to the switch elements as a result of a change in voltage of the control lines. The change in electrical potential of the signal lines sometimes leads to inadequate accuracy of detection of irradiation of radiation.

SUMMARY OF THE INVENTION

According to an aspect of the present invention, an apparatus includes a detecting pixel including a converting element configured to detect incidence of radiation and a switch element configured to connect to the converting element for detection, a different pixel including a different converting element, and a different switch element, the different converting element being connected to the different switch element, a signal line connected in common to a plurality of the switch elements for detection of a plurality of the detecting pixels, a driving unit configured to drive the different switch element and the switch element, and a control unit configured to control the driving unit, wherein the control unit controls the driving unit such that in a case where an on-state voltage or an off-state voltage is applied to at least one switch element among the plurality of the switch elements, a voltage of opposite polarity to the on-state voltage or the off-state voltage is applied to a different switch element that is different from the at least one switch element or a voltage of opposite polarity to the on-state voltage or the off-state voltage is applied to the different switch element.

According to another aspect of the present invention, an apparatus including a plurality of image capturing pixels for acquiring a radiation image and a plurality of detecting pixels each of which includes a converting element configured to detect incidence of radiation and a switch element being connected to the converting element for detection, includes a signal line connected in common to two or more switch elements for detection of the plurality of detecting pixels, a driving unit configured to drive the switch elements which are connected in common to the signal line, and a control unit configured to control the driving unit such that in a case where an on-state voltage or an off-state voltage is applied to at least one switch element among the two or more switch elements which are connected in common to the signal line, a voltage of opposite polarity to the on-state voltage or the off-state voltage is applied to a different switch element for detection that is different from the switch element.

According to yet another aspect of the present invention, an apparatus including an image capturing pixel including an image-capturing converting element for acquiring a radiation image and a switch element for image capturing which is connected to the image-capturing converting element and a detecting pixel including a converting element configured to detect incidence of radiation and a switch element configured to connect to the converting element, includes a control line connected to the switch element for image capturing, a signal line connected to the switch element and arranged to overlap with the image capturing pixel or the control line, a driving unit configured to drive the switch element for image capturing and the switch element, and a control unit configured to drive the driving unit such that in a case where an on-state voltage or an off-state voltage is applied to the switch element, a voltage of opposite polarity to the on-state voltage or the off-state voltage is applied to the switch element for image capturing.

According to yet another aspect of the present invention, an apparatus including a plurality of image capturing pixels for acquiring a radiation image and a plurality of detecting pixels each of which includes a converting element configured to detect incidence of radiation and a switch element being connected to the converting element for detection includes a driving unit configured to drive the switch element, a plurality of detection regions in each of which the plurality of detecting pixels is arranged, a control unit configured to control the driving unit to drive the plurality of detecting pixels arranged in each of the plurality of detection regions at different timings, and an acquiring unit configured to acquire an amount of incident radiation for each of the plurality of detection regions based on a value obtained by adding or averaging signals read from the plurality of detecting pixels driven by the driving unit.

Further features of the present invention will become apparent from the following description of exemplary embodiments with reference to the attached drawings.

BRIEF DESCRIPTION OF THE DRAWINGS

FIG. 14 illustrates an operation of a radiation imaging apparatus according to an eighth exemplary embodiment.

FIG. 15 illustrates a configuration of a radiation imaging apparatus according to a ninth exemplary embodiment.

FIG. 16 illustrates a configuration of a radiation imaging apparatus according to a tenth exemplary embodiment.

FIG. 17 illustrates an operation of the radiation imaging apparatus according to the tenth exemplary embodiment.

FIG. 18 illustrates a configuration of a radiation imaging apparatus according to an eleventh exemplary embodiment.

DESCRIPTION OF THE EMBODIMENTS

Various exemplary embodiments, features, and aspects of the invention will be described in detail below with reference to the drawings. In each of the exemplary embodiments, the term "radiation" refers to α rays, β rays, γ rays, and the like that are beams produced by particles (including photons) emitted due to radioactive decay, as well as beams having the same or higher amplitude of energy, such as X-rays, particle beams, cosmic rays, and the like.

Figure 1:
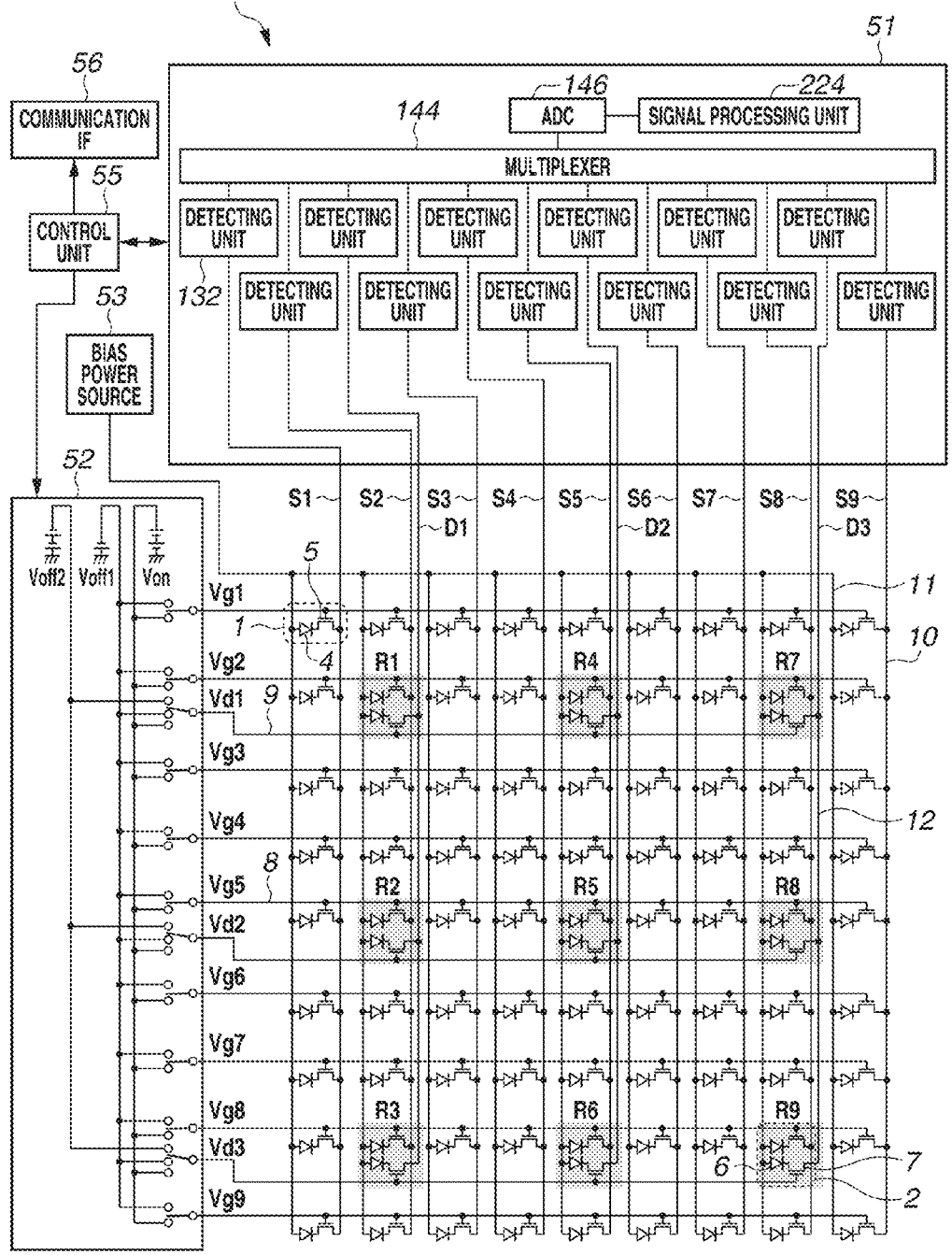
FIG. 1 illustrates a configuration of a radiation imaging apparatus according to a first exemplary embodiment.

The following describes a first exemplary embodiment with reference to FIG. 1. FIG. 1 illustrates a configuration of a radiation imaging apparatus according to the first exemplary embodiment. While an example in which 9×9 pixels are provided is illustrated in FIG. 1, 1000×1000 pixels may be provided, or 5000×5000 pixels may be provided.

A radiation imaging apparatus 200 illustrated in FIG. 1 includes a plurality of image capturing pixels 1 for acquisition of radiation images and a plurality of detecting pixels 2. Each of the plurality of detecting pixels 2 includes a detection converting element 6 for detection and a second switch element 7. The detection converting element 6 is configured to detect incidence of radiation. The second switch element 7 is connected to the detection converting element 6. The radiation imaging apparatus 200 further includes at least a detection signal line 12, a driving unit 52, and a control unit 55.

An array of pixels arranged in a direction in which a signal line 10 extends in the plurality of image capturing pixels 1 and the plurality of detecting pixels 2 refers to a column direction, and an array of pixels arranged in a direction perpendicular to the column direction refers to a row direction.

The image capturing pixels 1 are pixels for acquisition of radiation images. Each of the image capturing pixels 1 includes an image-capturing converting element 4 for image capturing and a first switch element 5. The detecting pixels 2 are pixels having a function for detecting incidence of radiation. Each of the detecting pixels 2 includes the image-capturing converting element 4, the first switch element 5, the detection converting element 6, and the second switch element 7. Accordingly, in the present exemplary embodiment, the detecting pixel 2 has a function for detecting incidence of radiation and also a function for acquiring a radiation image. While the configuration in which the detecting pixel 2 includes the image-capturing converting element 4, the first switch element 5, the detection converting element 6, and the second switch element 7 is described, the configuration of the detecting pixel 2 is not limited to the foregoing configuration. For example, the detecting pixel 2 may include only the detection converting element 6 and the second switch element 7. In this case, the detection converting element 6 of the detecting pixel 2 may be disposed in such a manner that the detection converting element 6 has the same size as the image-capturing converting element 4 of the image capturing pixel 1. Details will be described below in a third exemplary embodiment. A switch element for image capturing corresponds to the first switch element 5 in the present exemplary embodiment. Further, a switch element for detection corresponds to the second switch element 7 in the present exemplary embodiment.

The image-capturing converting element 4 and the detection converting element 6 may include a scintillator (not illustrated), which is configured to convert radiation into light, and a photoelectrical converting element, which is configured to convert light into an electrical signal. The scintillator, for example, may be formed in the shape of a sheet to cover an image-capturing region and may be shared by the plurality of image capturing pixels 1 and the plurality of detecting pixels 2. Alternatively, the image-capturing converting element 4 and the detection converting element 6 may include a converting element configured to convert radiation directly into an electrical signal.

The first switch element 5 and the second switch element 7 may include, for example, a thin-film transistor (TFT) having an active region made of a semiconductor, such as amorphous silicon, polycrystalline silicon, etc.

The image-capturing converting element 4 is connected to a reading unit 51 via the first switch element and the signal line 10 (S1 to S9). The detection converting element 6 is connected to the reading unit 51 via the second switch element 7 and the detection signal line 12. The detection signal line 12 is connected in common to at least two or more second switch elements 7 of the plurality of detecting pixels 2.

All the pixels are connected to a common bias line 11, and a predetermined bias voltage is applied to the pixels by a bias power source 53. The first switch element 5 disposed in a predetermined row is connected to a first control line 8 (Vg1 to Vg9). The second switch element 7 is connected to a second control line 9 (V1 to Vd3).

Further, in FIG. 1, nine radiation detection regions (region of interest (ROI)) (R1 to R9 in FIG. 1) for detection of radiation are provided. The detecting pixels 2 are disposed in the radiation detection regions (ROI). Further, the detecting pixels 2 in the radiation detection regions R1, R2, and R3 are connected to the common detection signal line 12 (D1 in FIG. 1). Similarly, the detecting pixels 2 in the radiation detection regions R4, R5, and R6 are connected to the common detection signal line 12 (D2 in FIG. 1), and the detecting pixels 2 in the radiation detection regions R7, R8, and R9 are connected to the common detection signal line 12 (D3 in FIG. 1).

The reading unit 51 may include a plurality of detecting units 132, a multiplexer 144, and an analog/digital converting unit 146 (hereinafter, "ADC"). Each of the plurality of signal lines 10 and the plurality of detection signal lines 12 is connected to a corresponding detecting unit 132 among the plurality of detecting units 132 of the reading unit 51. A single signal line 10 or detection signal line 12 corresponds to a single detecting unit 132. Each of the detecting units 132 includes, for example, a differential amplifier and a sample-and-hold circuit. The multiplexer 144 selects the plurality of detecting units 132 in a predetermined order and feeds a signal from the selected detecting unit 132 to the ADC 146. The ADC 146 converts the fed signal into a digital signal and outputs the digital signal. The output of the ADC 146 is fed to a signal processing unit 224 and processed by the signal processing unit 224. The signal processing unit 224 outputs, based on the output of the ADC 146, information indicating irradiation of radiation with respect to the radiation imaging apparatus 200. Specifically, the signal processing unit 224, for example, detects irradiation of radiation with respect to the radiation imaging apparatus 200 and calculates the dose of radiation or the integrated dose of radiation.

The driving unit 52 drives the plurality of image capturing pixels 1 via the first control line 8. Further, the driving unit 52 drives the plurality of detecting pixels 2 via the second control line 9. The driving unit 52 is electrically connected to the first control line 8 and the second control line 9. In the present exemplary embodiment, a Von voltage refers to a voltage by which the first switch element 5 and the second switch element 7 are switched to a conductive state. Further, a Voff1 voltage refers to a voltage by which the first switch element 5 and the second switch element 7 are switched to a non-conductive state. Further, Voff2 refers to a voltage of opposite polarity to the polarity of Von with respect to Voff1. Specifically, Voff2 is a voltage for the non-conductive period and an electrical potential difference between Voff2 and Von as a reference is larger than that between Voff1 and Von.

The control unit 55 controls the driving unit 52 and the reading unit 51. The control unit 55 controls, for example, the start and end of exposure (accumulation of electrical charge corresponding to the applied radiation by the image capturing pixel 1) based on the information from the signal processing unit 224. Specifically, the control unit 55 may measure the amount of incident radiation based on the amount of radiation that is detected by the detection converting element 6.

Figure 2:
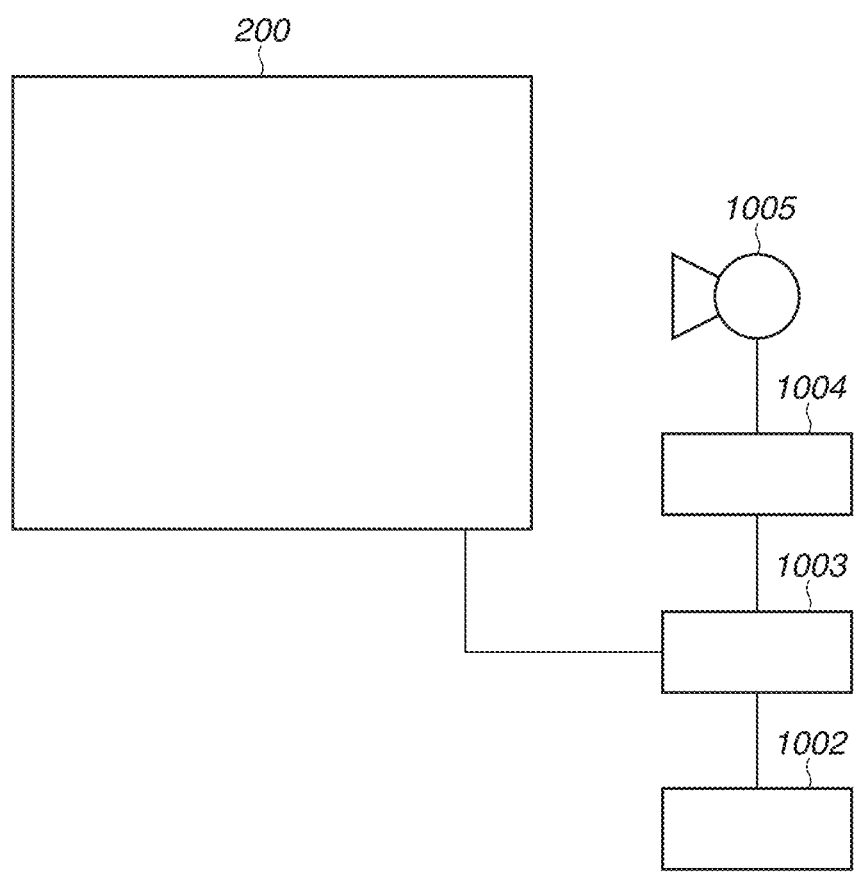
FIG. 2 illustrates an example of a configuration of a radiation imaging system including the radiation imaging apparatus.

FIG. 2 illustrates an example of a configuration of a radiation imaging system including the radiation imaging apparatus 200. The radiation imaging system includes a controller 1002, an interface 1003, a radiation source interface 1004, and a radiation source 1005 as well as the radiation imaging apparatus 200.

To the controller 1002, a dose A, irradiation time B (ms), tube current C (mA), tube voltage D (kV), radiation detection region (ROI) which is a region where radiation is to be monitored, and the like may be input. When an exposure switch attached to the radiation source 1005 is operated, radiation is emitted from the radiation source 1005. The control unit 55 of the radiation imaging apparatus 200, for example, sends an exposure stop signal to the radiation source interface 1004 via the interface 1003 when the value of integral of signals read from the detecting pixel 2 disposed in the radiation detection region (ROI) reaches a dose A'. In response, the radiation source interface 1004 causes the radiation source 1005 to stop the emission of radiation. The dose A' may be determined by the control unit 55 based on the dose A, radiation irradiation intensity, communication delay between the units, processing delay, and the like. In a case where the radiation irradiation time reaches the irradiation time B, the radiation source 1005 stops the irradiation of radiation regardless of the presence or absence of an exposure stop signal.

Figure 3A:
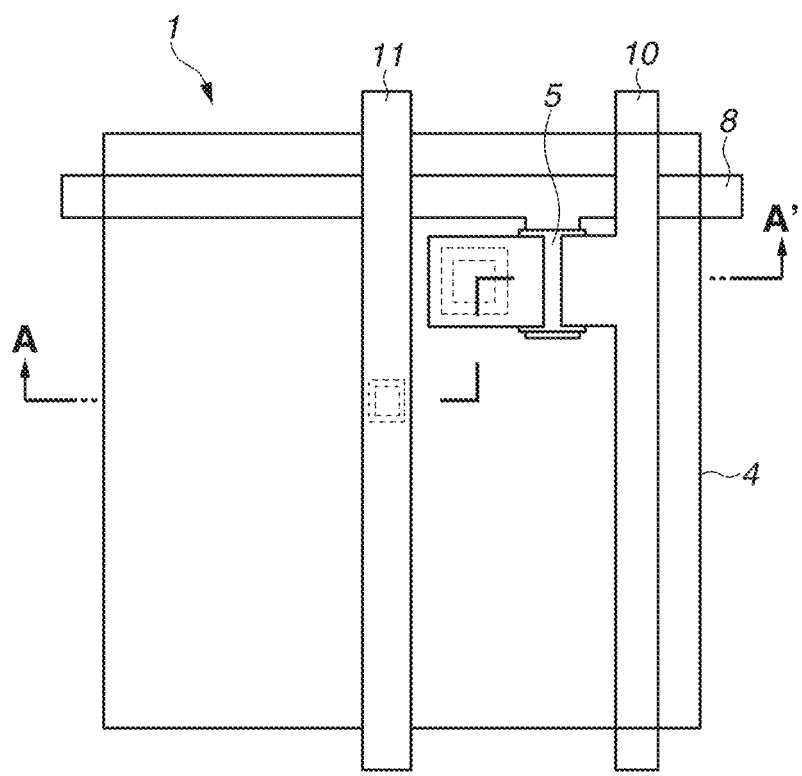
FIGS. 3A and 3B each illustrate an image capturing pixel of the radiation imaging apparatus according to the first exemplary embodiment.
Figure 3B:
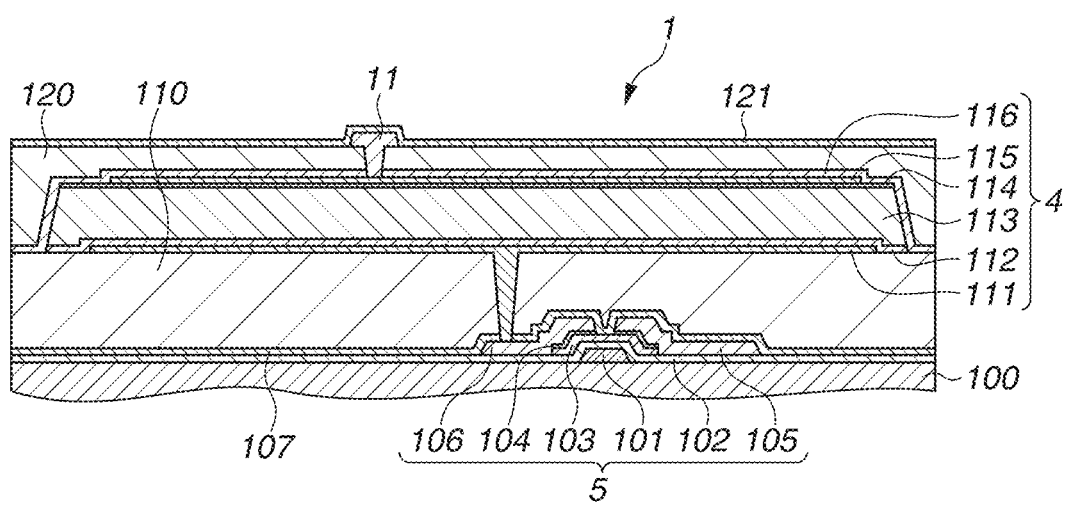

The following describes a configuration of an image capturing pixel with reference to FIGS. 3A and 3B. FIG. 3A is a plan view of the image capturing pixel 1, and FIG. 3B is a cross-sectional view of the image capturing pixel 1 along A-A'.

The image capturing pixel 1 according to the present exemplary embodiment includes the image-capturing converting element 4 and the first switch element 5 configured to output an electrical signal corresponding to an electrical charge of the image-capturing converting element 4. The image-capturing converting element 4 is stacked and disposed above the first switch element 5 provided on an insulating substrate 100 such as a glass substrate, and the like such that a first interlayer insulating layer 110 is held between the image-capturing converting element 4 and the first switch element 5. The first switch element 5 includes, on the substrate 100, a control electrode 101, a first insulating layer 102, a first semiconductor layer 103, a first impurity semiconductor layer 104, a first main electrode 105, and a second main electrode 106 in this order from the substrate 100 side. The first impurity semiconductor layer 104 has a higher impurity concentration than that of the first semiconductor layer 103. The first impurity semiconductor layer 104 includes partial regions in which the first impurity semiconductor layer 104 is in contact with the first main electrode 105 and the second main electrode 106, and a region between regions of the first semiconductor layer 103 that are in contact with the partial regions is a channel region of the first switch element 5. The control electrode 101 is electrically bonded to the control line 8. The first main electrode 105 is electrically bonded to the signal line 10. The second main electrode 106 is electrically bonded to an individual electrode 111 of the image-capturing converting element 4. In the present exemplary embodiment, the first main electrode 105, the second main electrode 106, and the signal line 10 are integrally formed by the same conductive layer, and the first main electrode 105 forms a part of the signal line 10. On the first main electrode 105, the second main electrode 106, and the signal line 10 are disposed a second insulating layer 107 and the first interlayer insulating layer 110 in this order from the signal line 10 side. While an inversely-staggered switch element using a semiconductor layer containing amorphous silicon as a main material and an impurity semiconductor layer is used as the switch element in the present exemplary embodiment, the switch element is not limited to the foregoing switch element. For example, a staggered switch element containing polycrystalline silicon as a main material may be used, or an organic TFT, oxide TFT, or the like may be used as the switch element. The first interlayer insulating layer 110 is disposed between the substrate 100 and a plurality of individual electrodes 111 so as to cover the first switch element 5 and includes contact holes. The individual electrode 111 of the image-capturing converting element 4 and the second main electrode 106 are electrically bonded together through the contact hole included in the first interlayer insulating layer 110. The image-capturing converting element 4 includes, on the first interlayer insulating layer 110, the individual electrode 111, a second impurity semiconductor layer 112, a second semiconductor layer 113, a third impurity semiconductor layer 114, and a common electrode 115 in this order from the first interlayer insulating layer 110 side. On the common electrode 115 of the image-capturing converting element 4 is disposed a third insulating layer 116. Further, the common electrode 115 of the image-capturing converting element 4 is electrically bonded to the bias line 11 disposed on a second interlayer insulating layer 120. Further, on the bias line 11 is disposed a fourth insulating layer 121 as a protection layer.

Figure 4A:
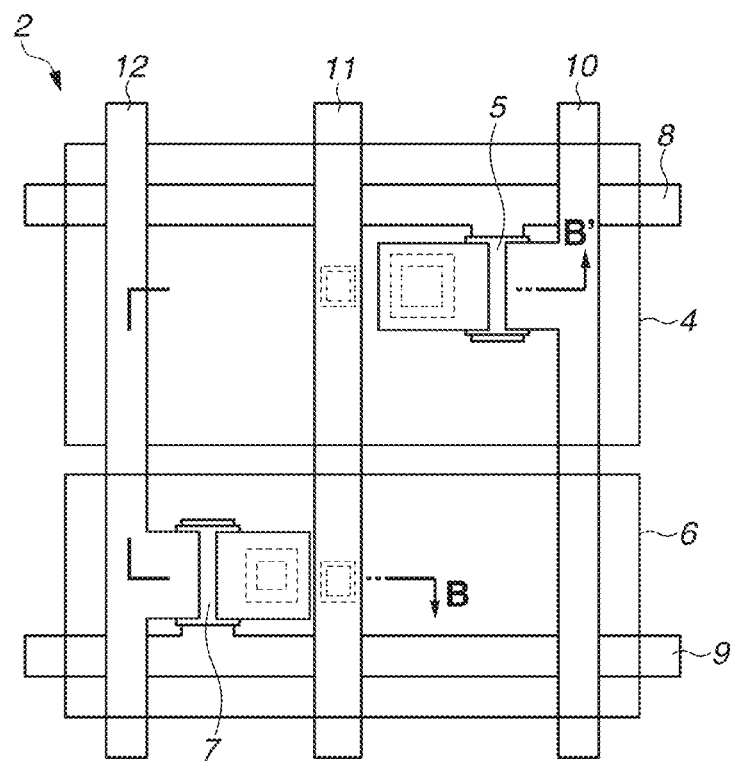
FIGS. 4A and 4B each illustrate a detecting pixel of the radiation imaging apparatus according to the first exemplary embodiment.
Figure 4B:
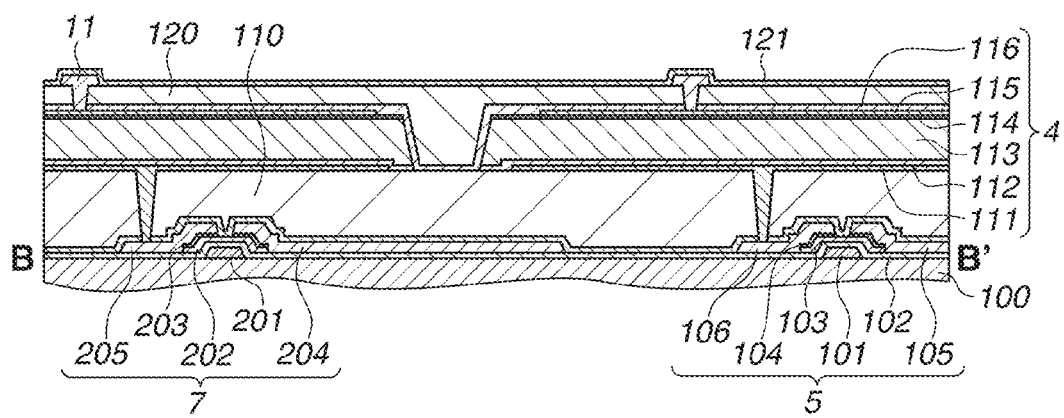

The following describes a configuration of a detecting pixel with reference to FIGS. 4A and 4B. FIG. 4A is a plan view of the detecting pixel 2, and FIG. 4B is a cross sectional view of the detecting pixel 2 along B-B'.

The detecting pixel 2 according to the present exemplary embodiment includes the image-capturing converting element 4, the first switch element 5, the detection converting element 6, and the second switch element 7. The detection converting element 6 is stacked on an upper layer of the first interlayer insulating layer 110 and has a similar structure to that of the image-capturing converting element 4 of the image capturing pixel 1. The common electrode 115 of the image-capturing converting element 4 and the detection converting element 6 is electrically bonded to the bias line 11 disposed on the second interlayer insulating layer 120. Further, the individual electrode 111 of the detection converting element 6 is connected to the detection signal line 12 through the contact hole included in the first interlayer insulating layer 110. Further, on the detection signal line 12 are disposed the second insulating layer 107 and the first interlayer insulating layer 110 in this order from the detection signal line 12 side.

In the present exemplary embodiment, the area of an opening of the image-capturing converting element 4 of the detecting pixel 2 is smaller than that of the image capturing pixel 1. Thus, the amount of signal from the detecting pixel 2 decreases. The resulting effect can be reduced by adjusting the gain of the detecting unit 132 or correcting a captured image. The correction can be realized by the processing, such as interpolation processing using values of the image capturing pixels 1 around the detecting pixel 2, or the like. While the image-capturing converting element 4 and the detection converting element 6 are p-intrinsic-n (PIN) sensors in the present exemplary embodiment, the image-capturing converting element 4 and the detection converting element 6 are not limited to the foregoing sensors, and it is also possible to use metal insulator semiconductor (MIS) or TFT sensors.

Figure 5:
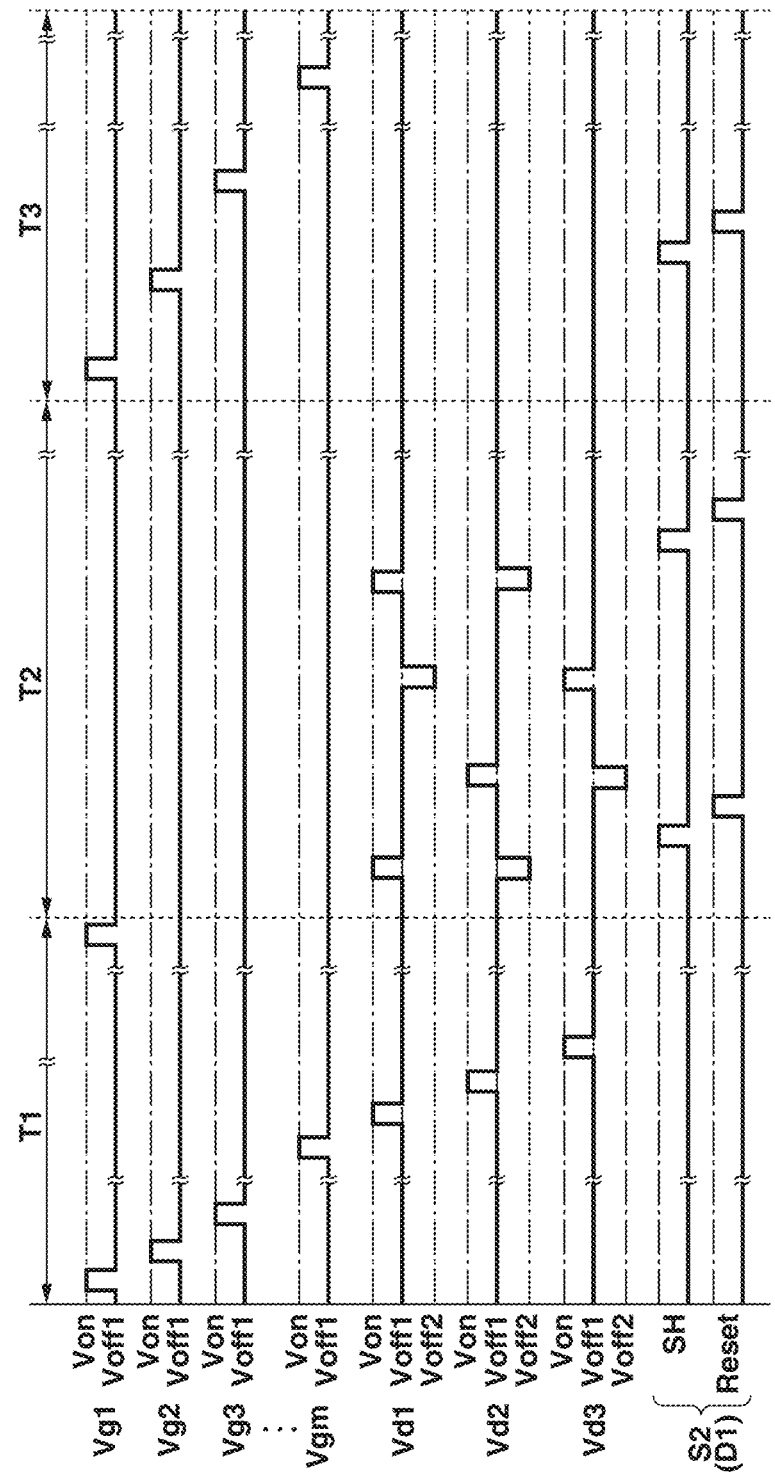
FIG. 5 illustrates an operation of the radiation imaging apparatus according to the first exemplary embodiment.

The following describes operations of the radiation imaging apparatus according to the present exemplary embodiment with reference to a timing chart illustrated in FIG. 5. Hereinafter, voltage applied to the first control line 8 configured to drive the image capturing pixel 1 will be referred to as signals Vg1 to Vgm (m corresponds to 9 in FIG. 1), and voltage applied to the second control line 9 configured to drive the detecting pixel 2 will be referred to as Vd1 to Vd3. The first switch element 5 and the second switch element 7 are in the conductive state when a signal fed to a gate is high level, whereas the first switch element 5 and the second switch element 7 are in the non-conductive state when a signal fed to the gate is low level. The combination of the signal level and the conductive state may be determined based on a combination of the circuit configuration and the conductivity of the switch element. Further, the reading unit 51 and the driving unit 52 illustrated in FIG. 5 operate based on the control by the control unit 55. In FIG. 5, the high level is denoted by "Von," and the low level is denoted by "Voff." Further, "on-state voltage" corresponds to "Von" in the present exemplary embodiment. Further, "off-state voltage" corresponds to "Voff" in the present exemplary embodiment.

First, a time T1 illustrated in FIG. 5 will be described. The time T1 is the period during which the start of irradiation of radiation is waited. In the present exemplary embodiment, the time T1 is the period from the point at which the radiation imaging apparatus 200 is turned on and becomes ready to capture a radiation image to the point at which the exposure switch of the radiation source 1005 is operated and irradiation of radiation is detected. In the time T1, the Von voltage is sequentially applied to the first switch element 5 and the second switch element 7, and the individual electrodes 111 of the image-capturing converting element 4 and the detection converting element 6 are reset to the electrical potentials of the signal line 10 and detection signal line 12. The voltage Von may constantly be applied to the second switch element 7. This prevents accumulation of electrical charges due to a dark current in the converting element of the image sensor pixel 1 over a long period of time. The length of the time T1 varies significantly depending on an image capture method, conditions, and the like but may be, for example, several seconds to several minutes.

Next, a time T2 illustrated in FIG. 5 will be described. The time T2 is the period during which radiation is applied. For example, the time T2 is the period from the point at which the start of irradiation of radiation is detected to the point at which the amount of exposure of radiation reaches an optimum dose. The time T2 can also be described as the time during which the dose of radiation is monitored. In the time T2, Von is intermittently applied to Vd1 to Vd3, and the second switch element 7 of the detecting pixel 2 is intermittently switched to the conductive state. Voff1 is constantly applied to Vg1 to Vgm, so the first switch element 5 is in the non-conductive state. Meanwhile, there are cases where the electrical potential of the detection signal line 12 is changed via a parasitic capacitance between the second control line 9 and the detection signal line 12 when Von or Voff is applied to the second switch element 7. For example, based on the application of Von or Voff, an electrical charge is instantly injected from the second control line 9 to the detection signal line 12 via the parasitic capacitance to cause a change in the electrical potential of the detection signal line 12. In this case, the electrical charge based on the parasitic capacitance that appears in the detection signal line 12 is transferred to the reading unit 51 via the detection signal line 12. As used herein, the "parasitic capacitance" refers to a capacitance component caused by a material of the detection signal line 12, physical structure, a distance from other lines and the like, dielectric constant of material between the detection signal line 12 and other lines and the like.

In a case where Von or Voff (on-state voltage or the off-state voltage) is applied to at least one of the two or more second switch elements 7 connected in common to the detection signal line 12, the driving unit 52 applies a voltage of opposite polarity to the Von or Voff voltage, which is applied to the at least one of the second switch elements 7, to the second switch element 7 different from the at least one of the second switch elements 7 to which the Von or Voff voltage is applied. As specified by the time T2 in FIG. 5, the driving unit 52 applies Voff2, which has an opposite polarity to Von, to Vd2 at a timing that overlaps with the timing at which Von is applied to Vd1. The overlapping timing is desirably but not limited to a simultaneous timing. For example, the overlapping timing does not have to be fully simultaneous and may be any timing at which the electrical charge injected due to the parasitic capacitance as a result of the application of Von or Voff to one of the two or more second switch elements 7 connected in common to the detection signal line 12 can substantially be suppressed. Further, the phrase "can substantially be suppressed" indicates that the effect of the electrical charge caused by the parasitic capacitance with respect to a signal from the detecting pixel 2 needs to be suppressed only to an extent that adequate detection accuracy of the detection system is obtained.

Further, each of the voltages Von, Voff1, and Voff2 is defined based on the capacitance between the second control line 9 and the detection signal line 12. The following describes the effect of the parasitic capacitance and the respective voltages in the present exemplary embodiment with reference to formulas. For example, an electrical charge Q, which appears in the detection signal line 12 via the parasitic capacitance when the Von voltage is applied to Vd1, can be represented by the following formula 1:

$$Q = Cgs \times (Von - Voff) \times n \qquad (1),$$

where Cgs is the parasitic capacitance between the second control line 9 and the detection signal line 12, and the number of second control lines to which Von is applied simultaneously.

To cancel an electrical charge Q, the driving unit 52 applies the Voff2 voltage to Vd2 simultaneously with the application of the Von voltage to Vd1. An electrical charge Q', which is generated when the Voff2 voltage is applied to Vd2, is represented by the following formula 2:

$$Q' = Cgs \times (Voff - Voff2) \times m \qquad (2),$$

where m is the number of second control line to which the Von voltage is applied simultaneously.

In the present exemplary embodiment, n=m=1, so each of the Von, Voff, and Voff2 may be defined to satisfy the following formula 3, $$(Von - Voff) = (Voff - Voff2) \qquad (3).$$

Simultaneously with the return of Vd1 from the Von voltage to the Voff voltage, Vd2 is returned from the Voff2 voltage to the Voff1 voltage. In this way, the electrical charge generated due to the parasitic capacitance at the timing at which Vd1 is switched to Von or Voff can be reduced. Then, in the line D1, the detecting unit 132 performs sampling and holding to reset the electrical charge of the detection signal line 12 at the timing when the on-state time of the second switch element 7 is ended. By the foregoing control, the electrical charge generated due to the parasitic capacitance can be suppressed so that the reading unit 51 can read necessary detection signals of the detection converting element 6 with high accuracy. Then, after the dose of radiation that is read by the reading unit 51 reaches a set value, the control unit 55 can send a signal to an external device via the communication IF 1003 to control the irradiation of radiation, and the like.

Next, a time T3 illustrated in FIG. 5 will be described. The time T3 is the period during which the signals accumulated in the image capturing pixel 1 by the radiation are read after the end of irradiation of radiation. In the time T3, the driving units Vd1 to Vdn are set to the low level. In the time T3, in order to prevent the floating of the detection signal line 12, it is desirable to connect the detection signal line 12 to a fixed electrical potential. Further, in order to scan the first control line 8, the Von voltage is sequentially applied to Vg1 to Vg9, and signals accumulated in the image-capturing converting element 4 are transferred to the reading unit 51 via the signal line 10.

In the first exemplary embodiment, as described above, the pixels for detection of radiation are sequentially read during the irradiation of radiation (corresponding to the time T2). Therefore, small signals are acquired more frequently compared to the reading of the image capturing pixels, so the effect of the parasitic capacitance is more likely to appear in the detection signal. Thus, the control unit 55 causes the driving unit 52 to apply the on-state voltage or the off-state voltage to at least one of the two or more second switch elements 7 connected in common to the detection signal line 12. In this case, the driving unit 52 applies to a second switch element 7 different from the at least one of the second switch elements 7 to which the on-state voltage or the off-state voltage is applied a voltage of opposite polarity to the on-state voltage or the off-state voltage applied to the at least one of the second switch elements 7. In this way, a change in electrical potential that occurs in a detection signal line due to a switch of a control signal to a switch element of a pixel for detection of radiation can be suppressed. Furthermore, the radiation imaging apparatus according to the first exemplary embodiment enables highly-accurate reading of irradiation of radiation so that a contribution can be made to realization of more appropriate dose control and exposure control.

Figure 6:
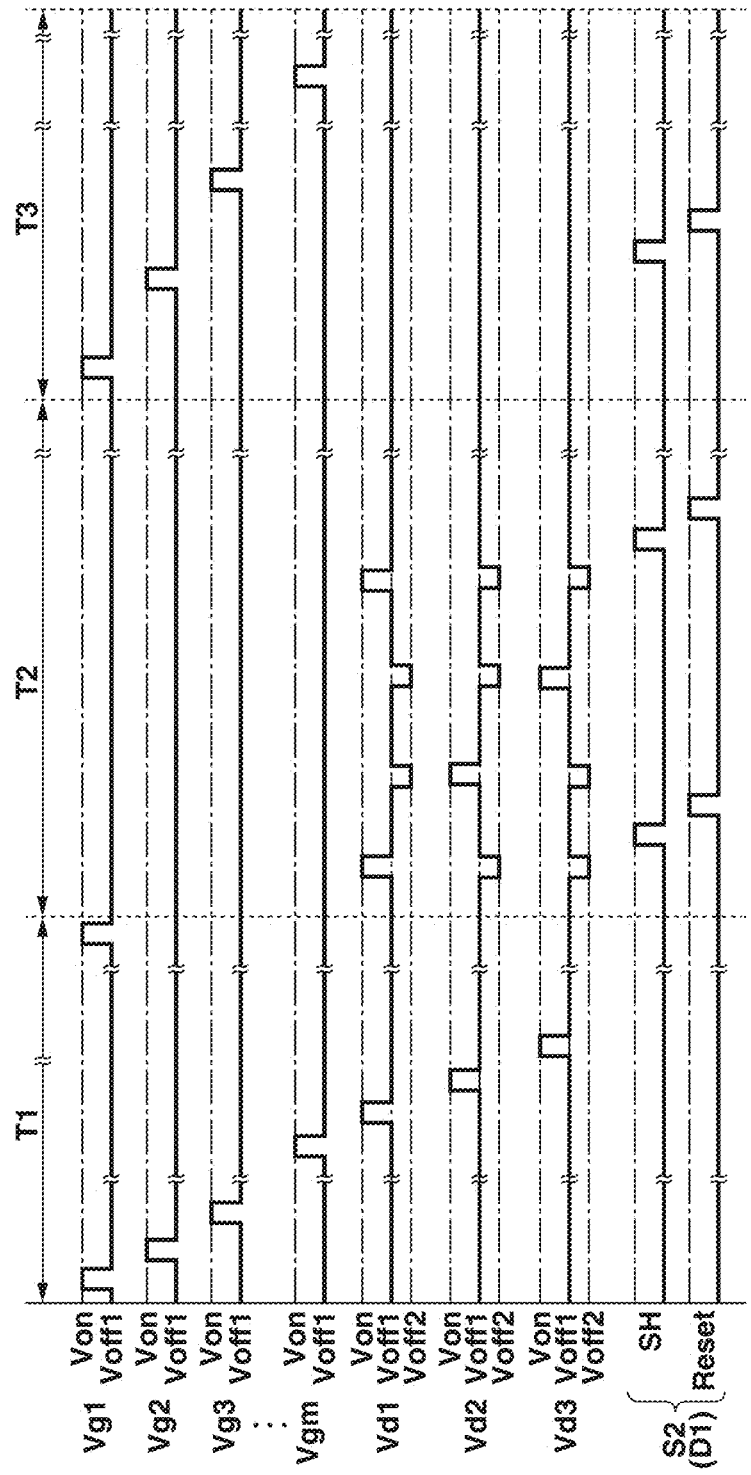
FIG. 6 illustrates an operation of a radiation imaging apparatus according to a second exemplary embodiment.

The following describes a second exemplary embodiment with reference to FIG. 6. FIG. 6 illustrates an operation of a radiation imaging apparatus according to the second exemplary embodiment. The radiation imaging apparatus according to the present exemplary embodiment has a similar configuration to that of the first exemplary embodiment. The control unit 55 causes the driving unit 52 to apply the on-state voltage or the off-state voltage to at least one of the two or more second switch elements 7 connected in common to the detection signal line 12. The present exemplary embodiment is different from the first exemplary embodiment in that in the foregoing case, a voltage of opposite polarity to the on-state voltage or the off-state voltage applied to at least one of the second switch elements 7 is applied to a plurality of second switch elements 7 different from the at least one of the second switch elements 7 to which the on-state voltage or the off-state voltage is applied. Specifically, in the time T2 illustrated in FIG. 6, the driving unit 52 supplies the Voff2 voltage, which has an opposite polarity to that of the Von voltage, to Vd2 and Vd3 at a timing that overlaps with the timing at which the Von voltage is applied to Vd1. Voltages that are desirable for the foregoing case can be calculated using the formulas 1 and 2. In the second exemplary embodiment, the voltages Vd2 and Vd3 are to be changed at the overlapping timing, so n=1 and m=2. In this case, a relationship between the voltages is represented by the following formula 4:

$$(Von - Voff) = 2 \times (Voff - Voff2) \qquad (4).$$

By the foregoing, a change in electrical potential that occurs in a detection signal line due to a switch of a control signal to a switch element of a pixel for detection of radiation can be suppressed. Furthermore, the radiation imaging apparatus according to the first exemplary embodiment enables highly-accurate reading of irradiation of radiation so that a contribution can be made to realization of more appropriate dose control and exposure control.

Figure 7:
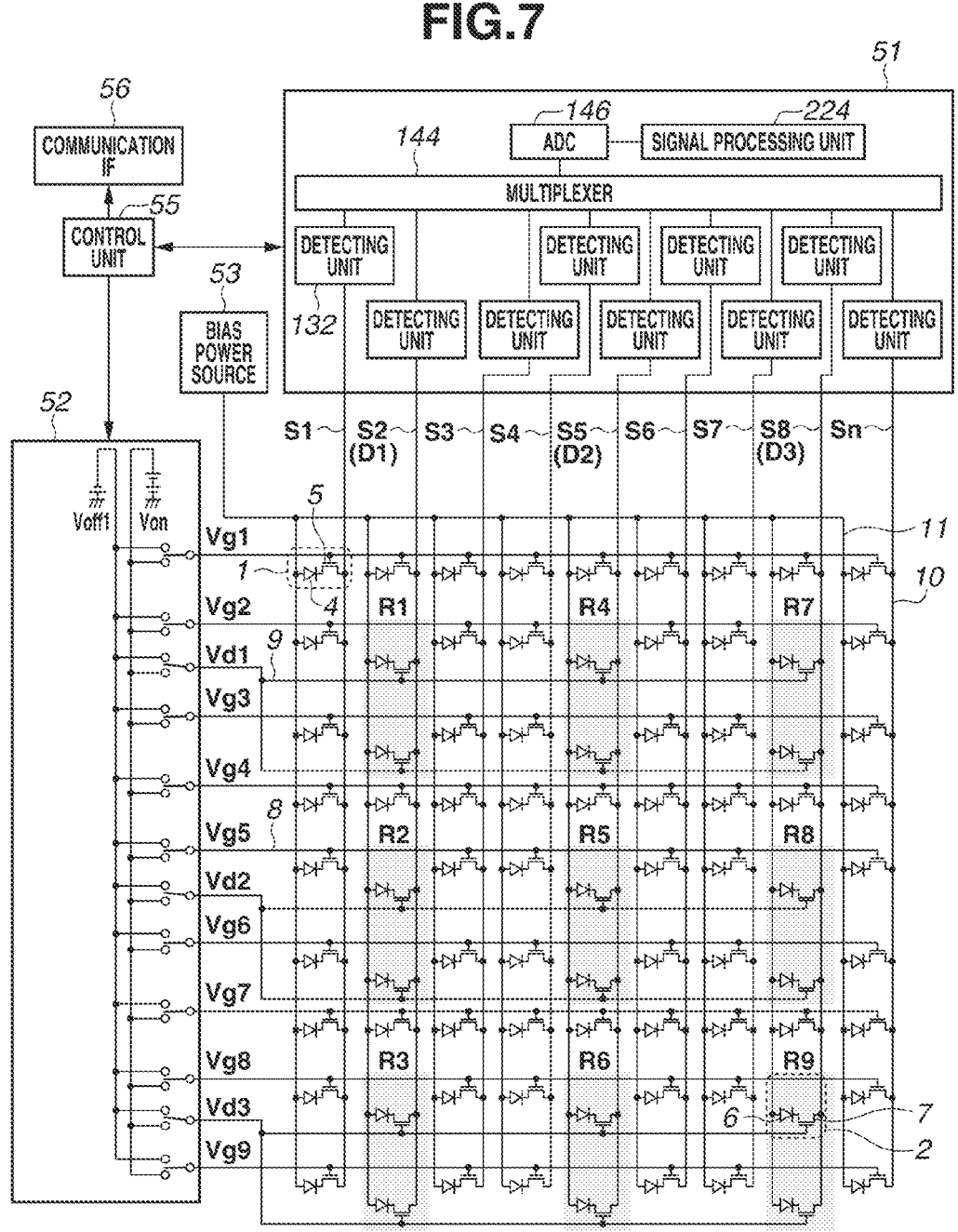
FIG. 7 illustrates a configuration of a radiation imaging apparatus according to a third exemplary embodiment.
Figure 8:
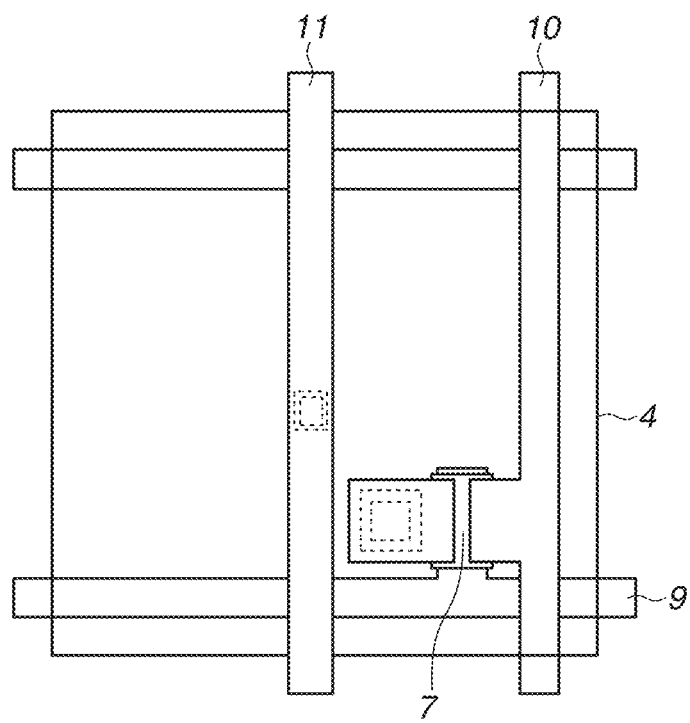
FIG. 8 illustrates a detecting pixel of the radiation imaging apparatus according to the third exemplary embodiment.

The following describes a third exemplary embodiment with reference to FIGS. 7 and 8. FIG. 7 illustrates a configuration of a radiation imaging apparatus according to the third exemplary embodiment. FIG. 8 illustrates a configuration of a detecting pixel according to the third exemplary embodiment. While FIG. 7 illustrates an example in which 9×9 pixels are provided, 1000×1000 pixels may be provided, or 5000×5000 pixels may be provided. A difference in configuration between the present exemplary embodiment and the first exemplary embodiment is that in the present exemplary embodiment, the detecting pixel 2 includes a combination of the detection converting element 6 and the second switch element 7 and does not include the image-capturing converting element 4 and the first switch element 5, as illustrated in FIG. 7 and FIG. 8. Further, an image-capturing pixel and a signal line are shared in the detecting pixel 2. The foregoing configuration allows the detection converting element 6 to be arranged in a larger area so that the radiation detection sensitivity can be increased. Further, the detection converting element 6 is connected to the signal line 10 via the second switch element 7. In this case, since no image-capturing converting element 4 is arranged in the detecting pixel 2, the detecting pixel 2 becomes a defective pixel, but correction can be performed by complementing data from output of adjacent image capturing pixels and image data. Further, in the present exemplary embodiment, a plurality of detecting pixels is arranged in a single detection region (ROI). In this case, the detecting pixels 2 are desirably in at least a regular arrangement in a row, a column, or an oblique direction in a detection region 20. As used herein, the term "regular arrangement" refers to not only a case of a continuous arrangement but also a case where the image capturing pixels 1 and the detecting pixels 2 are arranged at predetermined intervals in the detection region 20. Thus, the reading unit 51 calculates (obtains) the amount of radiation incident on each detection region 20 based on a value obtained by adding or averaging values corresponding to signals acquired from the plurality of detecting pixels 2 arranged in the detection region 20. The addition or averaging processing is performed by processing digital signals acquired from the ADC 146 by the signal processing unit 224. The addition or averaging processing is not limited to the foregoing processing, and the detecting unit 132 may supply the ADC 146 with a value obtained by adding or averaging analog signals acquired from the plurality of detecting pixels 2 and input to the differential amplifier so that the amount of incident radiation can be calculated (obtained). Further, the control unit 55 can simultaneously read the detecting pixels 2 in the detection region 20 by controlling the driving unit 52. In this case, the effect of a change in electrical potential may become more significant. Thus, the effect of the operation according to each exemplary embodiment may increase.

Figure 9:
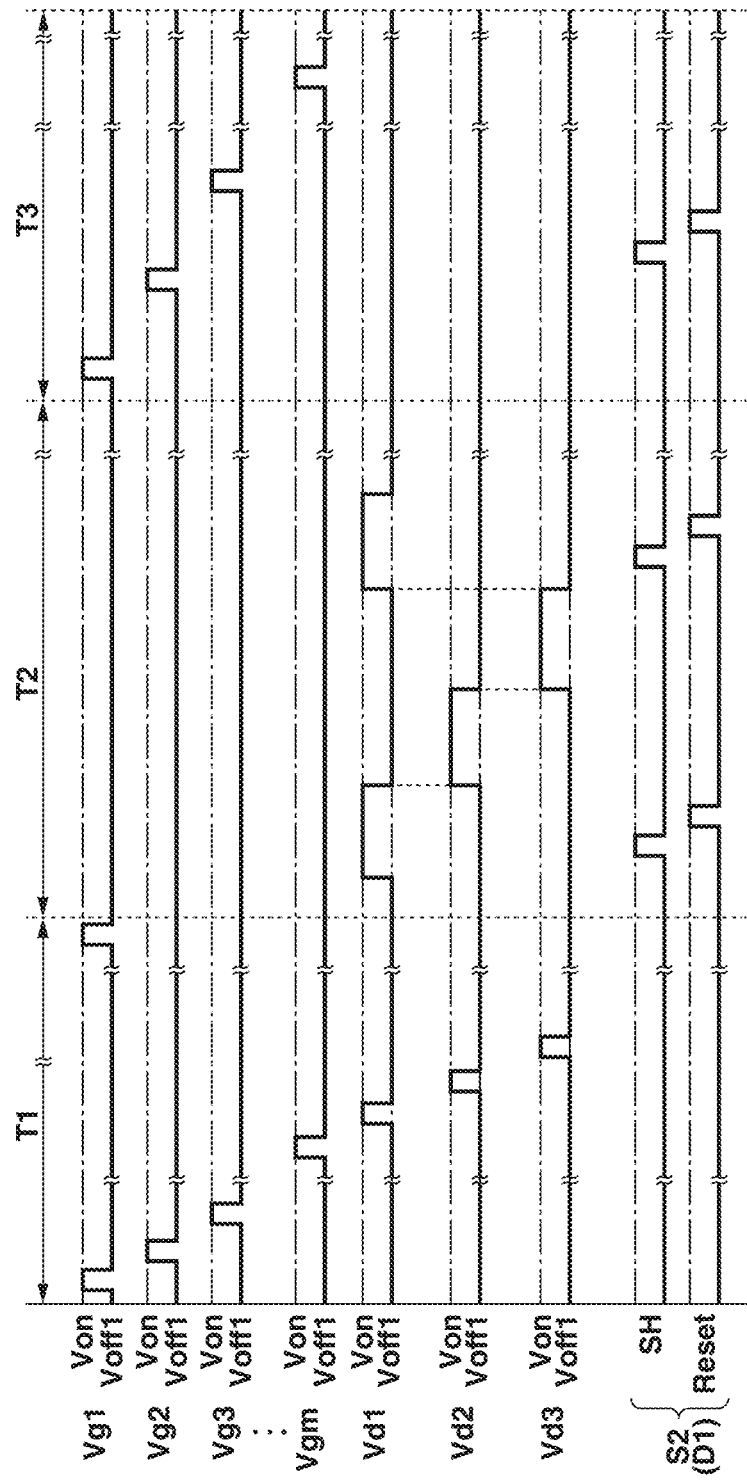
FIG. 9 illustrates an operation of a radiation imaging apparatus according to a fourth exemplary embodiment.

The following describes a radiation imaging apparatus according to the present exemplary embodiment with reference to FIG. 9. A difference in operation between the present exemplary embodiment and the first exemplary embodiment is that in the present exemplary embodiment, the sampling and holding of the signal line and the line resetting are performed when the driving voltage to the detecting pixel is in the on-state. Further, the control unit controls the driving unit such that the sequential application of Von to the detecting pixels and the application of the off-state voltage to a detecting pixel different from the detecting pixels to which the Von is applied occur at the same timing. The following describes detailed operations with reference to FIG. 9. Any of the foregoing configurations of the radiation imaging apparatus is applicable.

The operations during the times T1 and T3 illustrated in FIG. 9 are similar to those in the first exemplary embodiment. The time T2 in FIG. 9 is the period during which radiation is applied. During the time T2, as in the first exemplary embodiment, Voff is applied to Vg1 to Vg9, and the first switch element 5 is in the non-conductive state. Further, the control unit 55 controls the driving unit 52 to sequentially apply Von to Vd1 to Vd3. In this case, in order to suppress a change in electrical potential of the signal line 10 due to the parasitic capacitance, the Von voltage is applied to Vd2 at substantially the same timing as the timing of the application of the Voff voltage to Vd1. Similarly, Von is applied to Vd3 at substantially the same timing as the timing of the application of Voff to Vd2, and Von is applied to Vd1 at substantially the same timing as the timing of the application of Voff to Vd3. The foregoing operations are repeated with respect to each control line so that a change in electrical potential of the signal line due to the parasitic capacitance can be suppressed at the time of application of Von and Voff to the second switch elements 7. Further, compared to the first exemplary embodiment, the Voff control voltage includes a single type so that the configuration and control of the driving unit 52 can be simplified.

The following describes the timing of the sampling and holding of the detection signal. The control unit 55 controls the reading unit 51 to cause the reading unit 51 to read a signal appearing in a signal line connected to the detecting pixel 2 to which the on-state voltage is applied during the application of the on-state voltage by the driving unit 52. With regard to a signal line S2 (D1) of the signal line 10, the sampling and holding (SH in FIG. 9) and the line resetting are performed while Von is applied to Vd1 (during the application), as illustrated in FIG. 9. The foregoing applies to other signal lines S5 (D2) and S8 (D3) of the signal line 10. The foregoing control can increase the radiation detection speed while suppressing a change in electrical potential that occurs in the signal lines.

The foregoing arrangement according to the present exemplary embodiment enables highly-accurate reading of irradiation of radiation so that a contribution can be made to realization of more appropriate dose control and exposure control.

Figure 10:
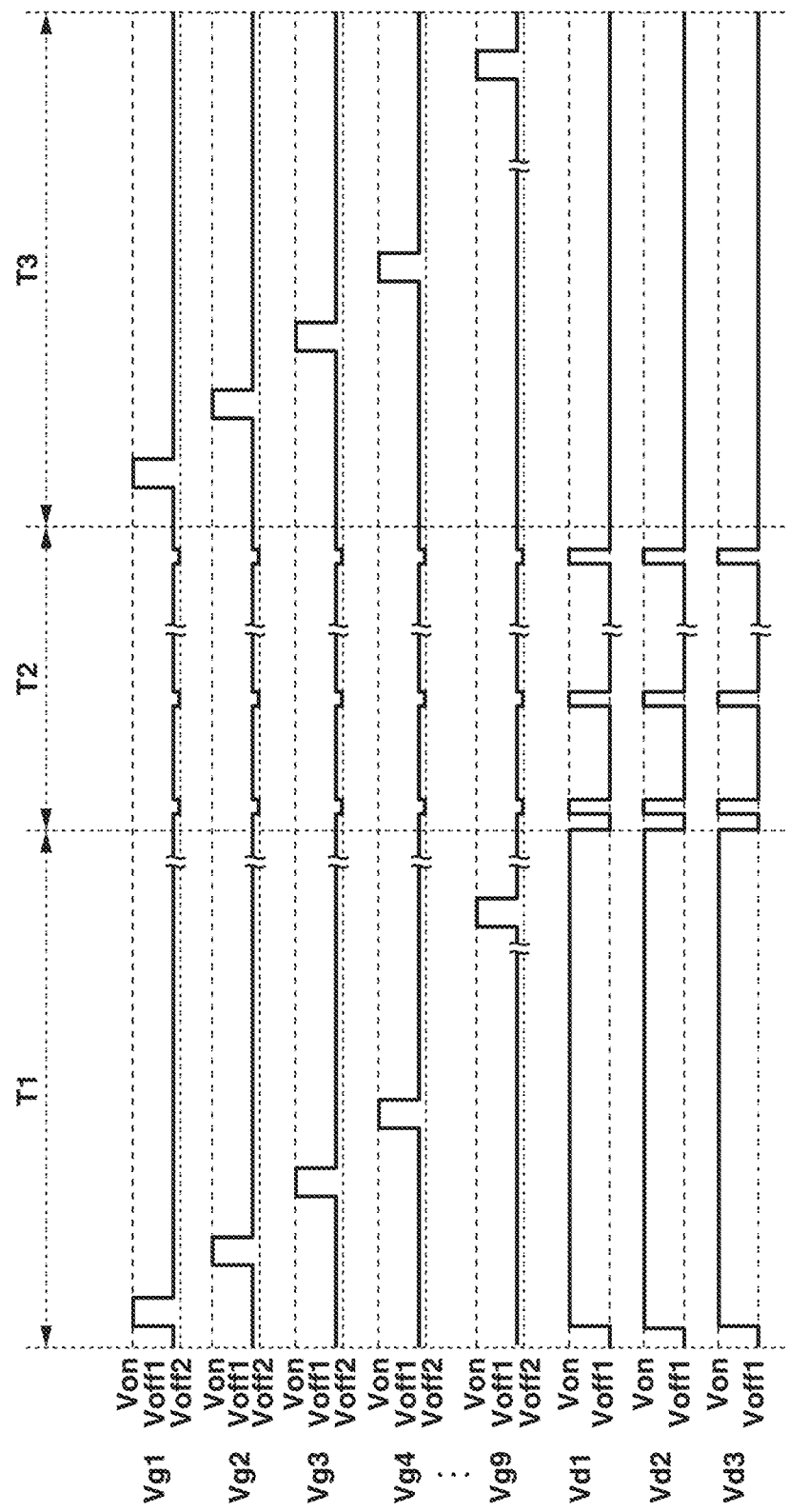
FIG. 10 illustrates an operation of a radiation imaging apparatus according to a fifth exemplary embodiment.

The following describes an operation of a radiation imaging apparatus according to a fifth exemplary embodiment with reference to a timing chart illustrated in FIG. 10. In the following description, voltages applied to the first control line 8 driving the image capturing pixel 1 will be referred to as Vg1 to Vg9, and voltages applied to the second control line 9 driving the detecting pixel 2 will be referred to as Vd1 to Vd3. The combination of the signal level and the conductive state may be determined based on a combination of the circuit configuration and the conductivity of the switch element. Further, the reading unit 51 and the driving unit 52 illustrated in FIG. 10 operate based on the control by the control unit 55, as described above. In FIG. 10, the high level is denoted by "Von," and the low level is denoted by "Voff." The Von voltage refers to a voltage by which the first switch element 5 and the second switch element 7 are switched to a conductive state. Further, the Voff1 voltage refers to a voltage by which the first switch element 5 and the second switch element 7 are switched to a non-conductive state. Further, Voff2 refers to a voltage of opposite polarity to the polarity of Von with respect to Voff1. Specifically, Voff2 is a voltage for the non-conductive period and an electrical potential difference between Voff2 and Von as a reference is larger than that between Voff1 and Von. Further, "on-state voltage" corresponds to "Von" in the present exemplary embodiment. Further, "off-state voltage" corresponds to "Voff" in the present exemplary embodiment.

First, a time T1 illustrated in FIG. 10 will be described. The time T1 is the period during which the start of irradiation of radiation is waited. In the present exemplary embodiment, the time T1 is the period from the point at which the radiation imaging apparatus 200 is turned on and becomes ready to capture a radiation image to the point at which the exposure switch of the radiation source 1005 is operated and irradiation of radiation is detected. In the time T1, the Von voltage is sequentially applied to the first switch element 5 and the second switch element 7, and the individual electrodes 111 of the image-capturing converting element 4 and the detection converting element 6 are reset to the electrical potentials of the signal line 10 and detection signal line 12. The voltage Von may constantly be applied to the second switch element 7. This prevents accumulation of electrical charges due to a dark current in the converting element of the image sensor pixel 1 over a long period of time. The length of the time T1 varies significantly depending on an image capture method, conditions, and the like, but may be, for example, several seconds to several minutes.

Next, a time T2 illustrated in FIG. 10 will be described. The time T2 is the period during which radiation is applied. For example, the time T2 is the period from the point at which the start of irradiation of radiation is detected to the point at which the amount of exposure of radiation reaches an optimum dose. The time T2 can also be described as the time during which the dose of radiation is monitored. In the time T2, Von is intermittently applied to Vd1 to Vd3, and the second switch element 7 of the detecting pixel 2 is intermittently switched to the conductive state. Meanwhile, there are cases where the electrical potential of the detection signal line 12 is changed via a parasitic capacitance between the second control line 9 and the detection signal line 12 when Von or Voff is applied to the second switch element 7. For example, based on the application of Von or Voff, an electrical charge is instantly injected from the second control line 9 to the detection signal line 12 via the parasitic capacitance to cause a change in the electrical potential of the detection signal line 12. In this case, the electrical charge based on the parasitic capacitance that appears in the detection signal line 12 is transferred to the reading unit 51 via the detection signal line 12. As used herein, the "parasitic capacitance" refers to a capacitance component caused by a material of the detection signal line 12, physical structure, a distance from other lines, and the like, dielectric constant of material between the detection signal line 12 and other lines, and the like.

Thus, in a case where Von or Voff (on-state voltage or the off-state voltage) is applied to a switch element for detection, the driving unit 52 applies a voltage of opposite polarity to the Von or Voff voltage to a switch element for image capturing. As specified by the time T2 in FIG. 10, the driving unit 52 applies Voff2, which has an opposite polarity to Von, to Vg1 to Vg9 at a timing that overlaps with the timing at which Von is applied to Vd1 to Vd3. The overlapping timing is desirably but not limited to a simultaneous timing. For example, the overlapping timing does not have to be fully simultaneous and may be any timing at which the electrical charge injected due to the parasitic capacitance as a result of the application of Von or Voff to one of the second switch elements 7 connected to the detection signal line 12. Further, the phrase "can substantially be suppressed" indicates that the effect of the electrical charge caused by the parasitic capacitance with respect to a signal from the detecting pixel 2 needs to be suppressed only to an extent that adequate detection accuracy of the detection system is obtained. As illustrated in FIG. 1, the image capturing pixel where the switch element for image capturing to which the voltage is applied is arranged to overlap the detection signal line 12 connected to the switch element for detection to which the on-state or off-state voltage is applied. Thus, the application of the voltage of opposite polarity generates an electrical charge via the parasitic capacitance between the image capturing pixel and the detection signal line 12, thereby acting to cancel the electrical charge generated at the time of driving the switch for detection. Further, the application of the voltage of opposite polarity can also act to cancel the electrical charge generated at the time of driving the switch for detection via the parasitic capacitance between the detection signal line 12 and the first control line 8 arranged to overlap the detection signal line 12.

Further, each of the voltages Von, Voff1, and Voff2 is defined based on the capacitance between the second control line 9 and the detection signal line 12. The following describes the effect of the parasitic capacitance and the respective voltages in the present exemplary embodiment with reference to formulas. For example, an electrical charge Q, which appears in the detection signal line 12 via the parasitic capacitance when the Von voltage is applied to Vd1, can be represented by the following formula 5:

$$Q = C_{gs} \times (V\text{on} - V\text{off}) \times n \quad (5),$$

where Cgs is the parasitic capacitance between the second control line 9 and the detection signal line 12, and the number of second control lines to which Von is applied simultaneously.

To cancel an electrical charge Q, the driving unit 52 applies the Voff2 voltage to Vg1 to Vg9 simultaneously with the application of the Von voltage to Vd1 to Vd3. As to the amplitude of the Voff2 voltage, an electrical charge Q', which is generated when the voltage of opposite polarity is applied, is represented by the following formula 6:

$$Q' = C_{gs}' \times (V\text{off} - V\text{off2}) \times m \quad (6),$$

where Cgs' is the parasitic capacitance between the detection signal line 12 and the image capturing pixel or control line overlapping with the detection signal line 12, and m is the number of first control lines to which Voff2 is applied simultaneously.

Based on Formula 6, the voltages can be set to amplitudes that Q can substantially be suppressed by Q'. Then, in Vd1 to Vd3, the detecting unit 132 performs the sampling and holding at the timing at which the on-state time of the second switch element 7 is ended, and the electrical charge of the detection signal line 12 is reset. By the foregoing control, the electrical charge generated due to the parasitic capacitance can be suppressed so that the reading unit 51 can read necessary detection signals of the detection converting element 6 with high accuracy. Then, after the dose of radiation that is read by the reading unit 51 reaches a set value, the control unit 55 can send a signal to an external device via the communication IF 1003 to control the irradiation of radiation, and the like. Further, the voltages to be applied from the driving unit 52 to the image capturing pixel 1 and the detecting pixel 2 are applied from the same direction. Therefore, the effect of a line time constant of the row direction is smaller than those in other exemplary embodiments. Thus, the effect of the parasitic capacitance can be suppressed with adequate accuracy by the operation of the control unit 55.

Next, a time T3 illustrated in FIG. 10 will be described. The time T3 is the period during which the signals accumulated in the image capturing pixel 1 by the radiation are read after the end of irradiation of radiation. In the time T3, the driving units Vd1 to Vd3 are set to the low level. In the time T3, in order to prevent the floating of the detection signal line 12, it is desirable to connect the detection signal line 12 to a fixed electrical potential. Further, in order to scan the first control line 8, the Von voltage is sequentially applied to Vg1 to Vg9, and signals accumulated in the image-capturing converting element 4 are transferred to the reading unit 51 via the signal line 10.

In the fifth exemplary embodiment, as described above, the pixels for detection of radiation are sequentially read during the irradiation of radiation (corresponding to the time T2). Therefore, small signals are acquired more frequently compared to the reading of the image capturing pixels, so the effect of the parasitic capacitance is more likely to appear in the detection signal. Thus, the control unit 55 causes the driving unit 52 to apply the on-state voltage or the off-state voltage to at least one of the two or more second switch elements 7 connected in common to the detection signal line 12. In this case, the driving unit 52 applies to the switch element for image capturing a voltage of opposite polarity to the switch element that receives the on-state voltage or the off-state voltage. In this case, the image capturing pixel in which the switch element for image capturing or the control line to which the switch for image capturing is connected is arranged to overlap the detection signal line. In this way, a change in electrical potential that occurs in a detection signal line due to a switch of a control signal to a switch element of a pixel for detection of radiation can be suppressed. Further, since the reading of the electrical charge caused by the parasitic capacitance can be suppressed, the dynamic range compression of each circuit included in the detecting unit 132 can be suppressed. Furthermore, the radiation imaging apparatus according to the fifth exemplary embodiment enables highly-accurate reading of irradiation of radiation so that a contribution can be made to realization of more appropriate dose control and exposure control.

Figure 11:
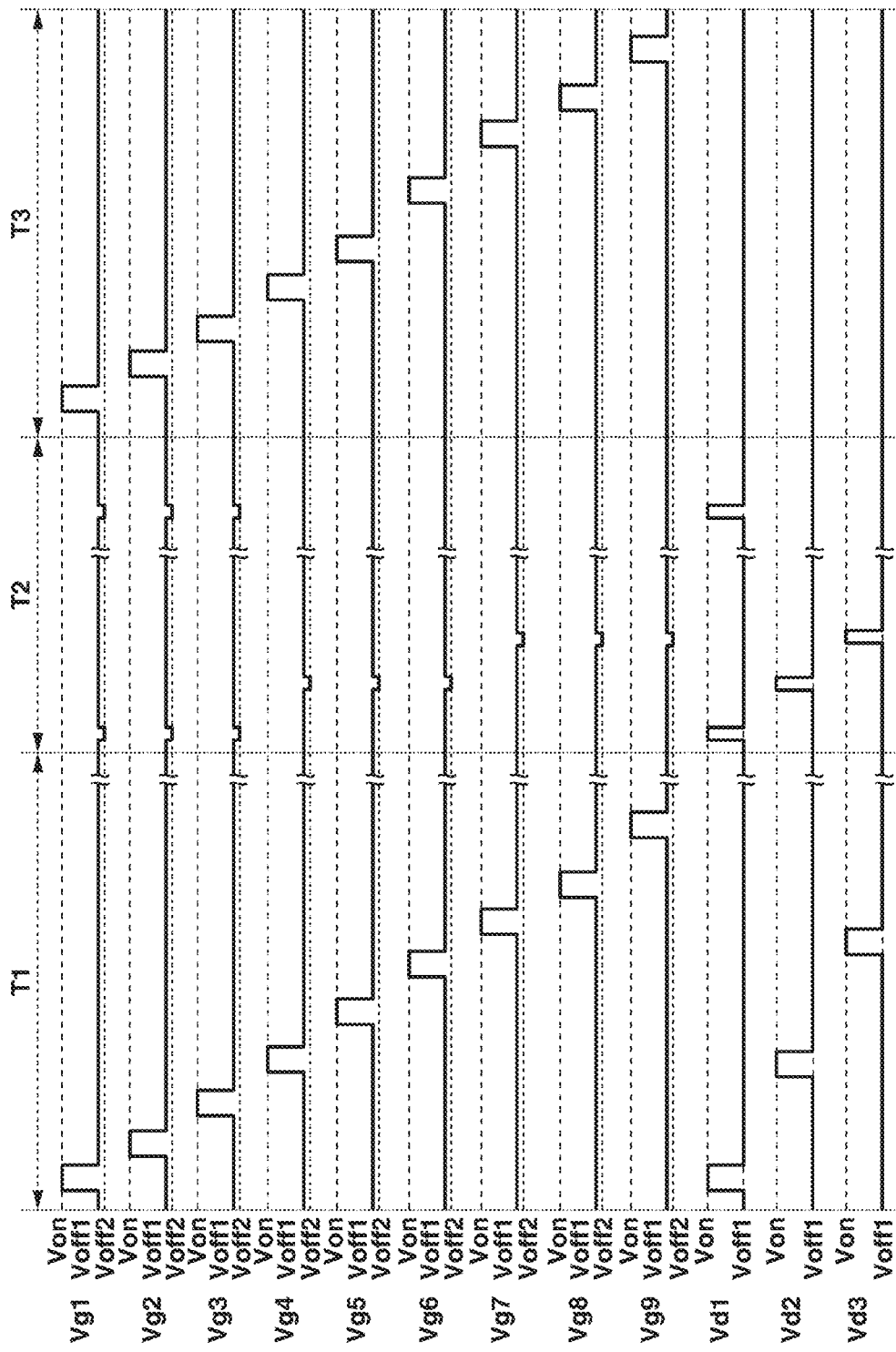
FIG. 11 illustrates an operation of a radiation imaging apparatus according to a sixth exemplary embodiment.

The following describes a sixth exemplary embodiment with reference to FIG. 11. FIG. 11 illustrates an operation of a radiation imaging apparatus according to the sixth exemplary embodiment. The radiation imaging apparatus according to the present exemplary embodiment has a similar configuration to that of the fifth exemplary embodiment. The sixth exemplary embodiment is different from the fifth exemplary embodiment in that during the time of irradiation of radiation, a voltage of opposite polarity is applied only to some of the plurality of control lines (Vg1 to Vg9). Specifically, the driving unit defines the voltage of opposite polarity that is to be applied to the switch element for image capturing based on the distance from the detection switch element to which the on-state voltage or the off-state voltage is applied.

First, a time T1 illustrated in FIG. 11 will be described. The time T1 is the period during which the start of irradiation of radiation is waited, as in the fifth exemplary embodiment. First, the time T1 is a preparation time prior to the radiation exposure, as in the first exemplary embodiment. The sixth exemplary embodiment is different from the first exemplary embodiment in that an example in which the radiation source and the radiation imaging apparatus are in synchronization and the radiation exposure timing can be acquired. In this case, the driving for resetting to a constant electrical potential is performed on a regular basis. Then, if radiation exposure information is sent from the radiation source, a transition to T2 in FIG. 3 is performed. In the present exemplary embodiment, the operation during the time T1 is not limited to the foregoing operation and may be similar to that in the fifth exemplary embodiment.

Next, a time T2 illustrated in FIG. 11 will be described. The time T2 is the period during which radiation is applied. In the present exemplary embodiment, the voltage of opposite polarity is applied only to some of the plurality of control lines (Vg1 to Vg9). For example, in FIG. 11, when the Von voltage is applied to Vd1, the Voff2 voltage is applied to Vg1 to Vg3 at the same time. Then, the Von voltage is sequentially applied to Vd2 and Vd3. In this case, as to the voltage applied to the respective control lines, the value of Voff2 is desirably larger than that in the case where the voltage is applied to all the control lines. As the foregoing describes, in the present exemplary embodiment, the amplitude of voltage of opposite polarity that is to be applied to the switch element for image capturing is defined based on the distance from the detection switch element. Thus, the effect of line time constant is smaller than that in the first exemplary embodiment, and the effect of the parasitic capacitance can be suppressed with adequate accuracy. The number of first control lines to which Voff2 is applied in the case of applying the voltage to each Vd may be determined based on the voltage resolution of the driving unit 52 and the accuracy. The time T3 is similar to that in the first exemplary embodiment, so detailed description of the time T3 is omitted.

Figure 12:
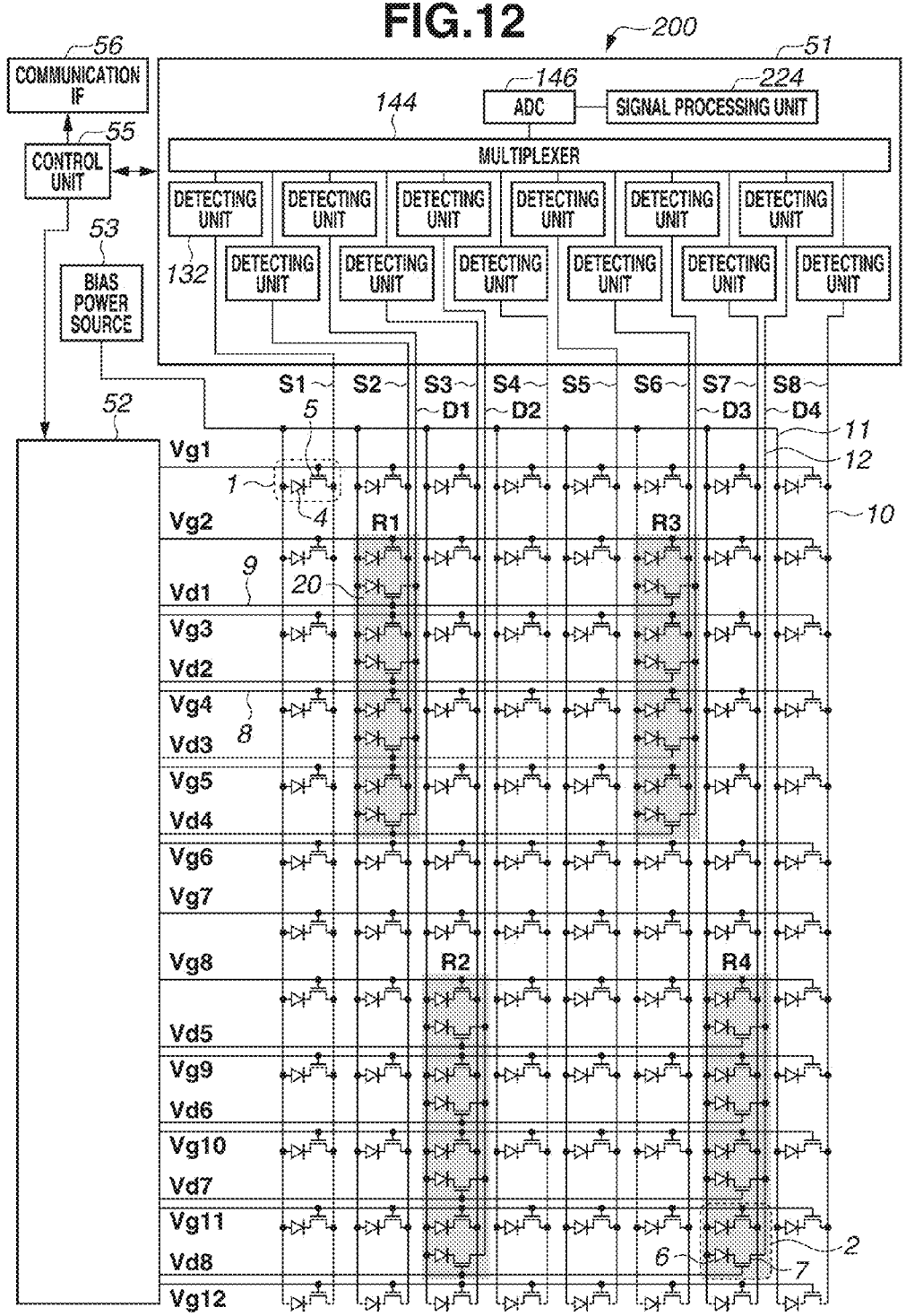
FIG. 12 illustrates a configuration of a radiation imaging apparatus according to a seventh exemplary embodiment.

The following describes a seventh exemplary embodiment with reference to FIG. 12. FIG. 12 illustrates a configuration of a radiation imaging apparatus according to the seventh exemplary embodiment. While FIG. 12 illustrates an example in which 12×8 pixels are provided, 1000×1000 pixels may be provided, or 5000×5000 pixels may be provided, as in FIG. 1. Those that are already described with reference to FIG. 1 are given the same reference numbers, and description thereof is omitted.

Figure 13:
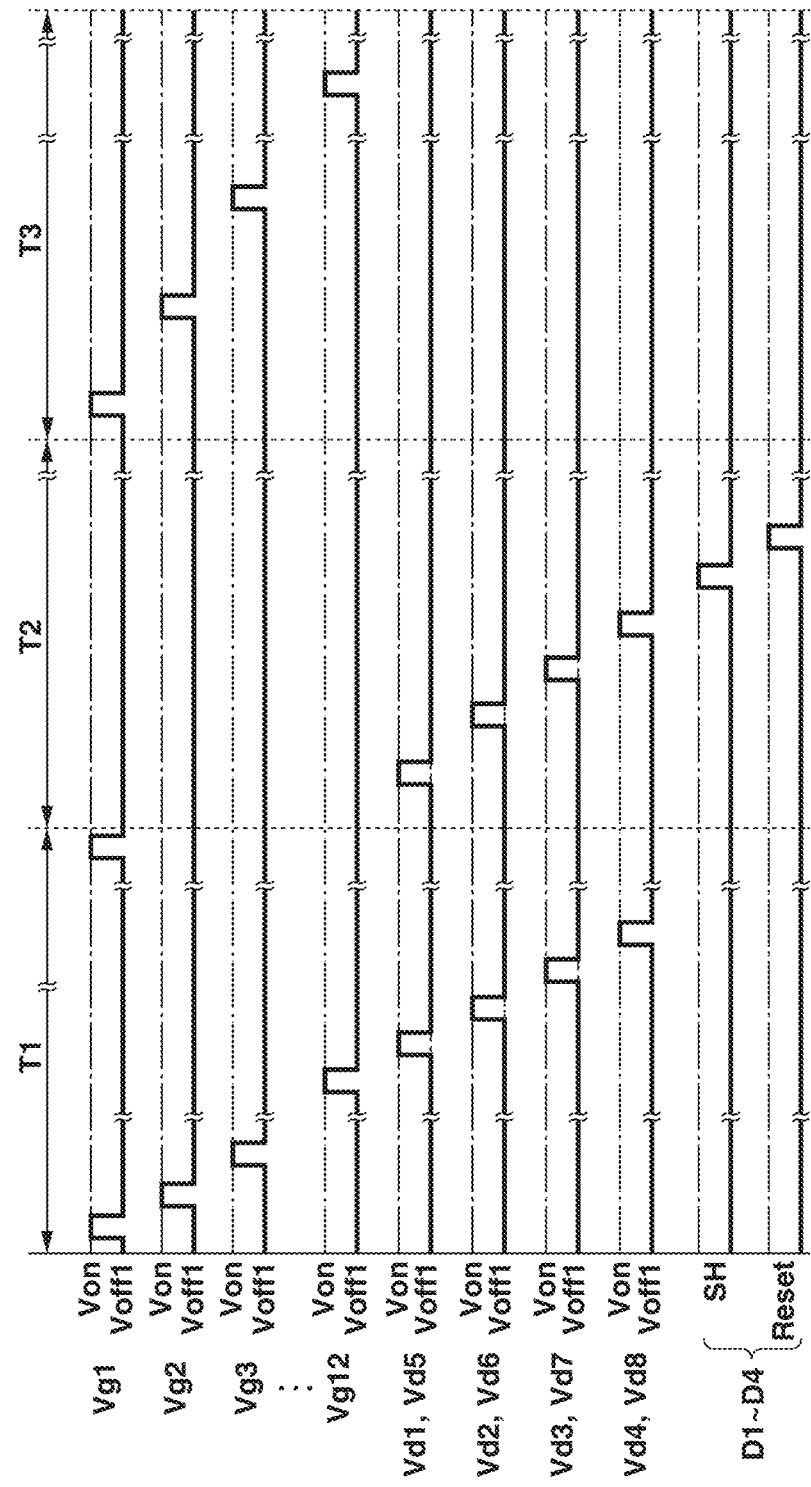
FIG. 13 illustrates an operation of the radiation imaging apparatus according to the seventh exemplary embodiment.

The following describes an operation of a radiation imaging apparatus according to the seventh exemplary embodiment with reference to a timing chart illustrated in FIG. 13. In the following description, a voltage applied to the first control line 8 configured to drive the image capturing pixel 1 will be referred to as signals Vg1 to Vgm (m corresponds to 12 in FIG. 1), and a voltage applied to the second control line 8 configured to drive the detecting pixel 2 will be referred to as Vd1 to Vd8. The first switch element 5 and the second switch element 7 are in the conductive state when a signal fed to a gate is high level, whereas the first switch element 5 and the second switch element 7 are in the non-conductive state when a signal fed to the gate is low level. The combination of the signal level and the conductive state may be determined based on a combination of the circuit configuration and the conductivity of the switch element. Further, the reading unit 51 and the driving unit 52 illustrated in FIG. 13 operate based on the control by the control unit 55. In FIG. 13, the high level is denoted by "Von," and the low level is denoted by "Voff." Further, "on-state voltage" corresponds to "Von" in the present exemplary embodiment. Further, "off-state voltage" corresponds to "Voff" in the present exemplary embodiment.

First, a time T1 illustrated in FIG. 13 will be described. The time T1 is the period during which the start of irradiation of radiation is waited. In the present exemplary embodiment, the time T1 is the period from the point at which the radiation imaging apparatus 200 is turned on and becomes ready to capture a radiation image to the point at which the exposure switch of the radiation source 1005 is operated and irradiation of radiation is detected. In the time T1, the Von voltage is sequentially applied to the first switch element 5 and the second switch element 7, and the individual electrodes 111 of the image-capturing converting element 4 and the detection converting element 6 are reset to the electrical potentials of the signal line 10 and the detection signal line 12. The voltage Von may constantly be applied to the second switch element 7. This prevents accumulation of electrical charges due to a dark current in the converting element of the image sensor pixel 1 over a long period of time. The length of the time T1 varies significantly depending on an image capture method, conditions, and the like but may be, for example, several seconds to several minutes.

Next, a time T2 illustrated in FIG. 13 will be described. The time T2 is the period during which radiation is applied. For example, the time T2 is the period from the point at which the start of irradiation of radiation is detected to the point at which the amount of exposure of radiation reaches an optimum dose. The time T2 can also be described as the time during which the dose of radiation is monitored. In the time T2, Von is intermittently applied to Vd1 to Vd8, the second switch element 7 of the detecting pixel 2 is intermittently switched to the conductive state, and a signal from the detecting pixel 2 is read. Since Voff1 is constantly applied to Vg1 to Vgm, the first switch element 5 is in the non-conductive state. Meanwhile, there are cases where the electrical potential of the detection signal line 12 is changed via a parasitic capacitance between the second control line 9 and the detection signal line 12 when Von or Voff is applied to the second switch element 7. For example, based on the application of Von or Voff, an electrical charge is instantly injected from the second control line 9 to the detection signal line 12 via the parasitic capacitance to cause a change in the electrical potential of the detection signal line 12. In the present exemplary embodiment, four detecting pixels 2 are arranged in the column direction in a single detection region 20. Thus, in a case where Von is simultaneously applied to the second control line 9 connected to the four detecting pixels 2 and the reading is performed, the effect of the electrical charge generated due to the parasitic capacitance between the second control line 9 and the detection signal line 12 becomes significant. In this case, the electrical charge based on the parasitic capacitance that appears in the detection signal line 12 is transferred to the reading unit 51 via the detection signal line 12. As used herein, the "parasitic capacitance" refers to a capacitance component caused by a material of the detection signal line 12, physical structure, a distance from other lines, and the like, dielectric constant of material between the detection signal line 12 and other lines, and the like.

The control unit 55 controls the driving unit 52 to cause the driving unit 52 to drive the plurality of detecting pixels 2 arranged in the respective detection regions 20 at different timings. Then, the amount of incident radiation incident on each detection region 20 can be acquired by the signal processing unit 224 via the reading unit 51. The control unit 55 controls the driving unit 52 and sequentially applies Von to the second switch element 7 to switch the second switch element 7 to the conductive state. Then, the reading unit 51 reads the plurality of detecting pixels 2 in a single detection region 20 at different timings to read the signal from the detection converting element 6 of the detecting pixel 2. Specifically, Von is sequentially applied to Vd1 to Vd4 and Vd5 to Vd8 as illustrated in FIG. 13. In this case, the reading unit 51 accumulates the read signal. For example, the output is accumulated in a feedback capacitance of a differential amplifier of the detecting unit 132. Then, when the application of Von to Vd1 to Vd8 is ended, the reading unit 51 causes the detecting unit 132 to perform sampling and holding and performs resetting of the detection signal line 12. As the foregoing describes, the plurality of detecting pixels 2 arranged in the respective detection regions 20 is driven at different timings so that the effect of the parasitic capacitance described above can be suppressed. While the output of the plurality of detecting pixels 2 in the detection regions 20 is added in the feedback capacitance of the differential amplifier in the present exemplary embodiment, this is not a limiting example. For example, data converted into digital data by the ADC 146 may be added or averaged. In a case where the detecting unit 132 adds analog signals, no noise of the time of digital conversion is added so that noise can be reduced. In the present exemplary embodiment, the detecting pixel 2 may be read more frequently than the image capturing pixel 1 during the period in which radiation is applied. Thus, the amount of signals of each detecting pixel 2 is smaller than that of the image capturing pixel 1. Accordingly, amplification of a signal of a predetermined detection region 20 or noise reduction can be performed by adding or averaging the signals of the plurality of detecting pixels 2, so that a contribution can be made to reduction of the effect of the parasitic capacitance component can be made.

In the present exemplary embodiment, the respective detection regions 20 (R1 to R4) are connected to different detection signal lines 12. Further, the common second control line 9 is connected between plurality of detection regions 20. Thus, the signals of the detecting pixels 2 of R1 to R4 of the respective detection regions 20 can be read at arbitrary timings. In the present exemplary embodiment, the control unit 55 can simultaneously perform the driving or reading of signals of the detecting pixels 2 arranged in different detection regions 20. For example, the control unit 55 controls the driving unit such that two or more detecting pixels 2 arranged in different detection regions 20 among the plurality of detection regions 20 are driven at timings that overlap. By the foregoing control, the driving unit 52 can simultaneously apply Von or Voff to Vd1 and Vd5. Similarly, the driving unit 52 can simultaneously apply Von or Voff to Vd2 and Vd6. Then, after the driving unit 52 applies Von to Vd1 to Vd4 and Vd5 to Vd8, the reading unit 51 performs sampling and holding (SH) in the detecting units 132 corresponding to the respective detection regions 20 and performs line resetting. Further, the reading unit 51 can acquire signals corresponding to the plurality of detection regions 20 at arbitrary timings. In this way, the radiation imaging apparatus according to the present exemplary embodiment can measure the amount of incident radiation in real time during the irradiation of radiation. Further, in the radiation imaging apparatus according to the present exemplary embodiment, the lines can be decreased compared to the case where the individual second control lines 9 are connected to the respective detection regions 20. Further, the detecting unit 132 can be shared by the plurality of detecting pixels in the detection regions 20, and the line of the detection signal line 12 can be reduced. In a case where the dose of radiation that is acquired by the reading unit 51 reaches a predetermined value, the control unit 55 can send a signal to an external device via the communication IF 56.

Next, a time T3 illustrated in FIG. 13 will be described. The time T3 is the period during which the signals accumulated in the image capturing pixel 1 by the radiation are read after the end of irradiation of radiation. In the time T3, the driving units Vd1 to Vdn are set to the low level. In the time T3, in order to prevent the floating of the detection signal line 12, it is desirable to connect the detection signal line 12 to a fixed electrical potential. Further, in order to scan the first control line 8, the Von voltage is sequentially applied to Vg1 to Vg9, and signals accumulated in the image-capturing converting element 4 are transferred to the reading unit 51 via the signal line 10. The radiation imaging apparatus according to the seventh exemplary embodiment enables highly-accurate reading of irradiation of radiation so that a contribution can be made to realization of more appropriate dose control and exposure control.

The following describes a radiation imaging apparatus according to an eighth exemplary embodiment with reference to FIG. 14. As to the configuration of the radiation imaging apparatus, the radiation imaging apparatus according to the seventh exemplary embodiment is applicable. The present exemplary embodiment is different from the seventh exemplary embodiment in that the control unit controls the driving unit such that the timing at which Von is sequentially applied to the detecting pixel is simultaneous with the timing at which Voff is applied to a detecting pixel different from the detecting pixel to which Von is applied. The following describes specific operations according to the present exemplary embodiment. Operations during times T1 and T3 in FIG. 14 are similar to those in the seventh exemplary embodiment. A time T2 in FIG. 14 is the period during which radiation is applied. The control unit 55 controls the driving unit 52 to sequentially apply Von to Vd1 to Vd3. In this case, in order to suppress a change in electrical potential of the signal line 10 due to the parasitic capacitance, the Von voltage is applied to Vd2 at substantially the same timing as the timing at which the Voff voltage is applied to Vd1. Similarly, Von is applied to Vd3 at substantially the same timing as the timing at which Voff is applied to Vd2, and Von is applied to Vd1 at substantially the same timing as the timing at which Voff is applied to Vd3. The foregoing operations are repeated for the respective control lines to suppress a change in electrical potential of the signal line due to the parasitic capacitance at the time of application of Von and Voff to the second switch element.

As the foregoing describes, the control unit 55 changes the voltage applied to at least one of the plurality of detecting pixels 2 arranged in the detection regions 20 from the conductive state to the non-conductive state. In this case, the control unit 55 controls the driving unit 52 to change the voltage applied to a detecting pixel 2 different from the detecting pixel 2 from the non-conductive state to the conductive state. The operation method according to the present exemplary embodiment can increase the driving speed compared to the seventh exemplary embodiment and can suppress a decrease in accuracy due to the parasitic capacitance of the detection signal line.

The following describes a radiation imaging apparatus according to a ninth exemplary embodiment with reference to FIGS. 15 and 8. Description of those that are already discussed in the seventh exemplary embodiment is omitted. FIG. 15 illustrates a configuration of a radiation imaging apparatus according to the ninth exemplary embodiment. FIG. 8 illustrates a configuration of a detecting pixel according to the ninth exemplary embodiment. The present exemplary embodiment is different in configuration from the first present exemplary embodiment is that the detecting pixel 2 includes a combination of the detection converting element 6 and the second switch element 7 and does not include the image-capturing converting element 4 and the first switch element 5, as illustrated in FIG. 8. The foregoing configuration allows the detection converting element 6 to be arranged in a larger area so that the radiation detection sensitivity can be increased. In this case, since no image-capturing converting element 4 is arranged in the detecting pixel 2, the detecting pixel 2 becomes a defective pixel, but correction can be performed by complementing data from output from adjacent image capturing pixels and image data. Further, in the radiation imaging apparatus according to the present exemplary embodiment, 2×2 detecting pixels, i.e., four pixels, are arranged in matrix in each detection region 20 (R1 to R4). The number of detecting pixels 2 in each detection region 20 is not limited to the number specified above. In the configuration, the second control line 9 is divided into a plurality of systems in each detection region 20 as in the seventh exemplary embodiment so that a change in electrical potential due to the parasitic capacitance can be suppressed.

The following describes a radiation imaging apparatus according to a tenth exemplary embodiment with reference to FIGS. 16 and 17. Description of those that are already described in the above exemplary embodiments is omitted.

FIG. 16 illustrates a configuration of the radiation imaging apparatus according to the tenth exemplary embodiment.

The present exemplary embodiment is different from the first to ninth exemplary embodiments in that the reading of signals from the image capturing pixel 1 and the detecting pixel 2 is performed by the common signal line (signal line 10). Further, the plurality of detection regions 20 are connected by the common signal line. Specifically, for example, the detecting pixels 2 of R1 and R2 of the plurality of detection regions 20 are connected to the common signal line 10 (S2). Similarly, the detecting pixels 2 of R3 and R4 of the detection regions 20 are connected to the common signal line (S6). This configuration enables the detecting unit to be shared so that the number of detecting units can be decreased compared to the above exemplary embodiments.

FIG. 17 illustrates an operation of the radiation imaging apparatus according to the tenth exemplary embodiment. Operations during times T1 and T3 in FIG. 17 are similar to those in the above exemplary embodiments.

A time T2 illustrated in FIG. 17 is the period during which radiation is applied. The definition of the period is similar to that in other exemplary embodiments. The control unit 55 performs control to acquire a signal from the detecting pixel of each detection region 20 connected to the common detecting unit. The control unit 55 first controls the driving unit 52 to sequentially apply Von to Vd1 to Vd4. Then, the control unit 55 switches Vd4 to the non-conductive state, performs sampling and holding (SH), and performs line resetting. Next, the control unit 55 sequentially applies Von to Vd5 to Vd8 to acquire signals from other detection regions 20. The control unit 55 switches Vd8 to the non-conductive state, performs sampling and holding (SH), and performs line resetting. Further, after the dose of radiation that is measured by the reading unit 51 reaches a set value, the control unit 55 may send a signal to the radiation source and stop the irradiation of radiation.

The present exemplary embodiment described above enables simplification of the configuration of the reading unit while enabling highly-accurate reading of irradiation of radiation so that a contribution can be made to realization of more appropriate dose control and exposure control.

The following describes a radiation imaging apparatus according to an eleventh exemplary embodiment with reference to FIGS. 18 and 19. Description of those that are already described in the above exemplary embodiments is omitted. The present exemplary embodiment is different from the above exemplary embodiments in that the second control line 9 is branched near the detection region 20 with respect to the plurality of detecting pixels 2 in the detection region 20.

FIG. 18 illustrates a configuration of the radiation imaging apparatus according to the eleventh exemplary embodiment.

An example in which the second control line 9 is separated into two branches near the detecting pixel 2 as illustrated in FIG. 18 is described. The number of branches is not limited to two, and the second control line 9 may be separated into more branches, at least as long as the second control line 9 is branched to decrease the parasitic capacitance described below. By the foregoing configuration, the number of intersections of the second control line 9 and the signal line 10 or the detection signal line 12 can be reduced. Further, artifacts of signals read from the signal line 10 due to the parasitic capacitance at the intersections of the second control line 9 and the signal line 10 can be decreased. A change in electrical potential of the detection signal line 12 due to the parasitic capacitance between the second control line 9 and the detection signal line 12 can be decreased.

Figure 19A:
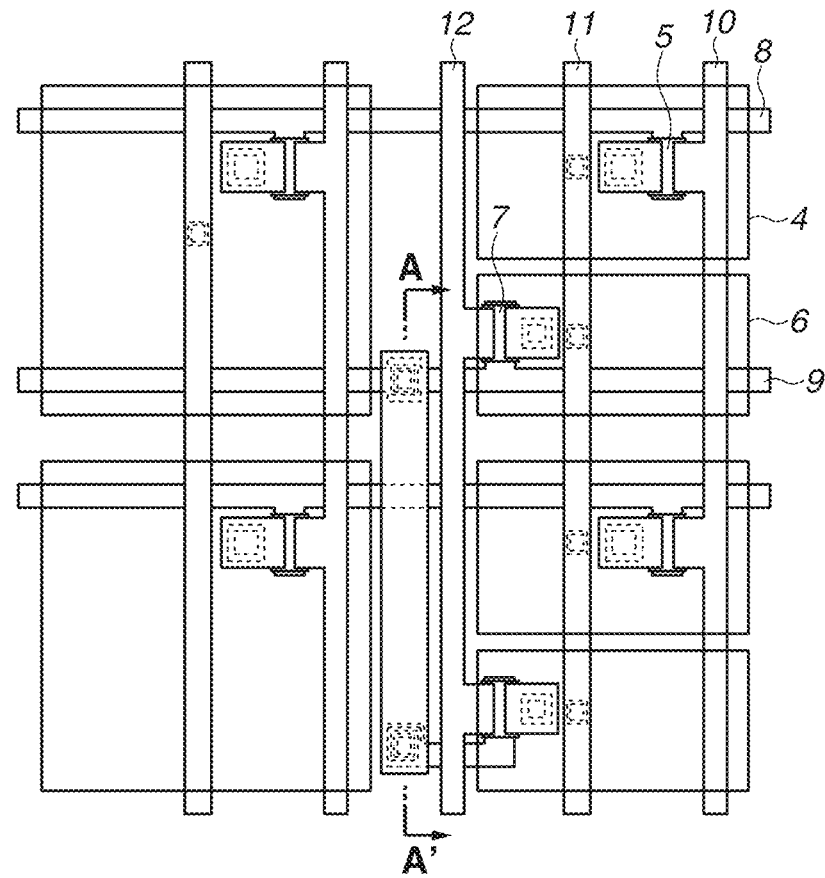
FIGS. 19A and 19B each illustrate pixels of the radiation imaging apparatus according to the eleventh exemplary embodiment.
Figure 19B:
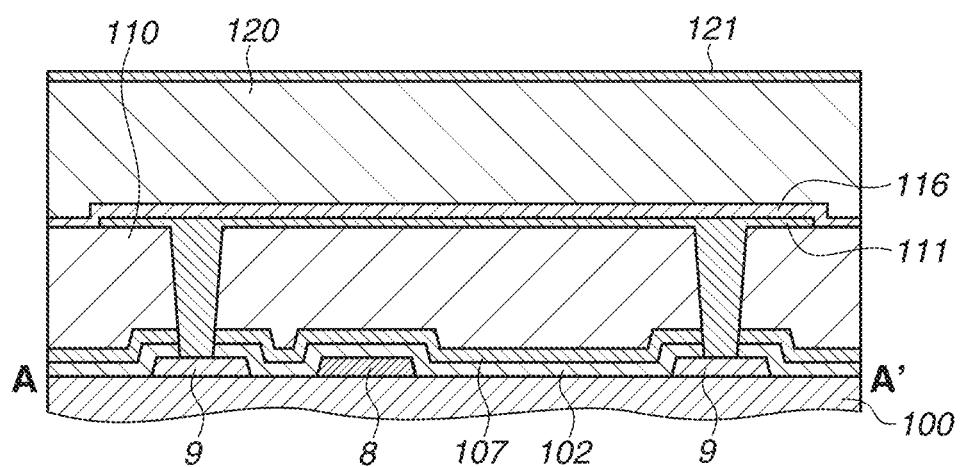

The following describes a configuration of the pixels according to the present exemplary embodiment with reference to FIGS. 19A and 19B. FIG. 19A is a plan view illustrating the pixels within a broken line specified in FIG. 18. FIG. 19B is a cross sectional view along A-A' specified in FIG. 19A. The second control line 9 in FIG. 19A is wired to a lower right pixel through a contact hole formed between an upper left pixel and an upper right pixel and is connected to the second switch element 7. As illustrated in FIG. 19B, the individual electrode 111 and the second control line 9 are connected together through the contact hole.

The configuration according to the present exemplary embodiment by which the parasitic capacitance can further be reduced enables highly-accurate reading of irradiation of radiation so that a contribution can be made to realization of more appropriate dose control and exposure control.

Figure 20:
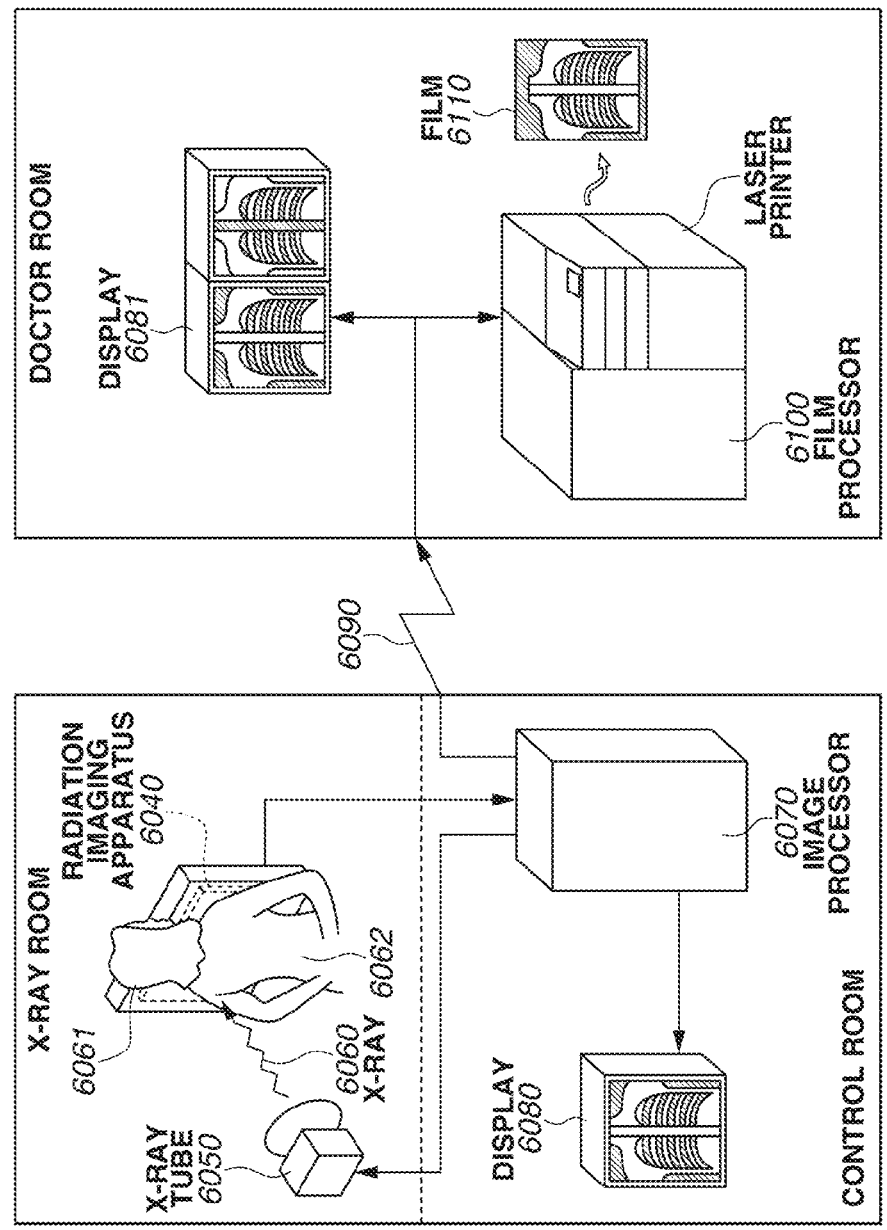
FIG. 20 illustrates an application example of a radiation imaging apparatus.

The following describes an example in which the radiation imaging apparatus 200 is applied to a radiation detection system, with reference to FIG. 20.

An X-ray 6060 generated by an X-ray tube 6050, which is a radiation source, passes through a chest 6062 of a patient or subject 6061 and enters the radiation imaging apparatus 200. The incident X-ray contains information about the inside of the body of the patient 6061. In response to the incidence of the X-ray, a converting unit 3 converts the radiation into electrical charge to obtain electrical information. The information is converted into digital data, undergoes image processing performed by an image processor 6070 as a signal processing unit, and can be observed on a display 6080 as a display unit in a control room.

Further, the information can be transferred to a distant area by a transmission processing unit, such as a telephone line 6090 and the like, and can be displayed on another display 6081 as a display unit in a doctor room, or the like, in another place or can be stored in a recording unit such as an optical disk, or the like, whereby a doctor in a distant area can diagnose. Further, the information can be recorded on a film 6110 as a recording medium by a film processor 6100 as a recording unit.

A computer or a control computer may execute a program (computer program) to realize an exemplary embodiment of the present invention. Further, a unit for supplying a program to a computer, e.g., a computer-readable recording medium recording the program such as a compact disk read-only memory (CD-ROM), etc. or a transmission medium for transmitting the program such as the Internet, etc. is also applicable as an exemplary embodiment of the present invention. Further, the program is also applicable as an exemplary embodiment of the present invention. The programs, recording mediums, transmission mediums, and program products are encompassed within the scope of exemplary embodiments of the present invention.

While the present invention has been described in detail with reference to exemplary embodiments, it is to be understood that the invention is not limited to the disclosed exemplary embodiments, and various other forms without departing from the spirit of the invention are also encompassed within the scope of the invention. Further, the exemplary embodiments described above are mere examples of an exemplary embodiment of the present invention and may be combined as appropriate.

This application claims the benefit of Japanese Patent Application 2014-249427, filed Dec. 9, 2014, No. 2014-249428, filed Dec. 9, 2014, and No. 2015-023715, filed Feb. 9, 2015, which are hereby incorporated by reference herein in their entirety.

What is claimed is:

1. An apparatus comprising:
    a detecting pixel including a converting element configured to detect incidence of radiation and a first switch element configured to connect to the converting element for detection;
    a different pixel including a different converting element and a second switch element which is connected to the different converting element;
    a signal line connected in common to a plurality of the first switch elements of a plurality of the detecting pixels;
    a driving unit configured to drive the first and second switch elements; and
    a control unit configured to control the driving unit,
    wherein the control unit controls the driving unit such that, during irradiation, in a case where a change in a voltage supplied to at least one first switch element of the plurality of the first switch elements is performed, a change in a voltage supplied to a different first switch element that is different from the at least one first switch element is performed in an opposite direction to the change in a voltage supplied to the at least one first switch element or a change in a voltage supplied to the second switch element is performed in an opposite direction to the change in a voltage supplied to the at least one first switch element.

2. The apparatus according to claim 1, wherein the control unit controls the driving unit such that a timing of the change in the voltage supplied to the at least one first switch element overlaps with a timing of the change in the voltage supplied to the different first switch element or the second switch element direction during irradiation.

3. The apparatus according to claim 1, wherein the control unit controls the driving unit such that a timing of the change in the voltage supplied to the at least one first switch element is simultaneous with a timing of the change in the voltage supplied to the different first switch element or the second switch element during irradiation.

4. The apparatus according to claim 1, wherein the driving unit applies an on-state voltage by which the first switch element is switched to a conductive state, a first off-state voltage by which the first switch element is switched to a non-conductive state, and a second off-state voltage having a larger difference from the on-state voltage than a difference between the first off-state voltage and the on-state voltage.

5. The apparatus according to claim 1, further comprising a control line configured to connect the driving unit and the first switch element,
wherein change amount of the voltage supplied to the first switch element is defined based on a capacitance between the control line and the signal line.

6. The apparatus according to claim 1, wherein the control unit makes the change in the voltage applied to the plurality of the first switch elements in the opposite direction at an overlapping timing during irradiation.

7. The apparatus according to claim 1, further comprising a reading unit configured to read a signal appearing in the signal line connected to the detecting pixel,
wherein the control unit controls, while an on-state voltage is applied to the first switch element, the reading unit to read a signal appearing in the signal line connected to the detecting pixel to which the on-state voltage is applied.

8. The apparatus according to claim 7, wherein the reading unit includes a sample-and-hold circuit and performs sampling and holding based on control by the control unit.

9. The apparatus according to claim 1, wherein the driving unit applies to the second switch element an on-state voltage by which the second switch element is switched to a conductive state, a first off-state voltage by which the second switch element is switched to a non-conductive state, and a second off-state voltage having a larger difference from the on-state voltage than a difference between the first off-state voltage and the on-state voltage.

10. The apparatus according to claim 1, wherein the signal line is further connected to the second switch element.

11. The apparatus according to claim 1, wherein an amount of incident radiation is measured based on an amount of radiation detected by the converting element, and the different converting element is a converting element for image capturing which is configured to acquire a radiation image.

12. A system comprising:
a radiation source configured to emit radiation; and
the apparatus according to claim 1.

13. A method for controlling an apparatus including a detecting pixel including a converting element configured to detect incidence of radiation and a first switch element configured to connect to the converting element for detection, a different pixel which includes a different converting element and a second switch which is connected to the different converting element, a signal line connected in common to a plurality of the first switch elements of a plurality of the detecting pixels, and a driving unit configured to drive the first and second switch elements,
wherein, during irradiation, in a case where a change in a voltage supplied to at least one first switch element of the plurality of the first switch elements is performed, a change in a voltage supplied to a different first switch element that is different from the at least one first switch element is performed in an opposite direction to the change in a voltage supplied to the at least one first switch element, or a change in a voltage supplied to the second switch element is performed in an opposite direction to the change in a voltage supplied to the at least one first switch element.

14. An apparatus comprising:
an image-capturing region including a plurality of pixels arranged in a column direction and a row direction for acquiring a radiation image, the plurality of pixels each including a converting element and a switch element configured to connect to the converting element;
a plurality of detecting pixels arranged separately from the plurality of pixels in the image-capturing region for detecting a start of incidence of radiation on the image-capturing region or measuring an amount of radiation incident on the image-capturing-region, the plurality of detecting pixels each including, a detection converting element configured to detect incidence of radiation and, a detection switch element configured to connect to the detection converting element;
a signal line connected in common to a plurality of the detection switch elements included in the plurality of the detecting pixels;
a driving unit configured to drive the switch element and the detection switch element; and
a control unit configured to control the driving unit,
wherein the control unit controls the driving unit such that, during irradiation, in a case where a change in a voltage supplied to at least one detection switch element of the plurality of the detection switch elements is performed, a change in a voltage supplied to a different detection switch element that is different from the at least one detection switch element is performed in an opposite direction to the change in a voltage supplied to the at least one detection switch element, or a change in a voltage supplied to the switch element is performed in an opposite direction to the change in a voltage supplied to the at least one detection switch element.

15. The apparatus according to claim 14, wherein the control unit controls the driving unit such that a timing of the change in the voltage supplied to the at least one detection switch element overlaps with a timing of the change in the voltage supplied to the different detection switch element or the switch element during irradiation.

16. The apparatus according to claim 14, wherein the control unit controls the driving unit such that a timing of the change in the voltage supplied to the at least one detection switch element is simultaneous with a timing of the change in the voltage supplied to the different detection switch element or the switch element during irradiation.

17. The apparatus according to claim 14, wherein the driving unit applies an on-state voltage by which the detection switch element is switched to a conductive state, a first off-state voltage by which the detection switch element is switched to a non-conductive state, and a second off-state voltage having a larger difference from the on-state voltage than a difference between the first off-state voltage and the on-state voltage.

18. The apparatus according to claim 14, further comprising a control line configured to connect the driving unit and the detection switch element,
wherein changed amount of the voltage supplied to the detection switch element is defined based on a capacitance between the control line and the signal line.

19. The apparatus according to claim 14, wherein the control unit performs the change in the voltage applied to the plurality of the detection switch elements in the opposite direction at an overlapping timing during irradiation.

20. The apparatus according to claim 14, further comprising a reading unit configured to read a signal appearing in the signal line connected to the detecting pixel,
wherein the control unit controls, while an on-state voltage is applied to the detection switch element, the reading unit to read a signal appearing in the signal line connected to the detecting pixel to which the on-state voltage is applied.

21. The apparatus according to claim 20, wherein the reading unit includes a sample-and-hold circuit and performs sampling and holding based on control by the control unit.

22. The apparatus according to claim 14, wherein the driving unit applies to the switch element an on-state voltage by which the switch element is switched to a conductive state, a first off-state voltage by which the switch element is switched to a non-conductive state, and a second off-state voltage having a larger difference from the on-state voltage than a difference between the first off-state voltage and the on-state voltage.

23. The apparatus according to claim 14, wherein the signal line is further connected to the switch element.

24. The apparatus according to claim 14, wherein an amount of incident radiation is measured based on an amount of radiation detected by the detection converting element, and the converting element is a converting element for image capturing which is configured to acquire a radiation image.

25. A system comprising:
a radiation source configured to emit radiation; and
the apparatus according to claim 14.

26. A method for controlling an apparatus including an image-capturing region including a plurality of pixels arranged in a column direction and a row direction for acquiring a radiation image, the plurality of pixels each including a converting element and a switch element configured to connect to the converting element, a plurality of detecting pixels arranged in the image-capturing region for detecting a start of incidence of radiation on the image-capturing region or measuring an amount of radiation incident on the image-capturing-region, the plurality of detecting pixels each including, a detection converting element configured to detect incidence of radiation and, a detection switch element configured to connect to the detection converting element, a signal line connected in common to a plurality of detection switch elements of the plurality of the detecting pixels, and a driving unit configured to drive the switch element and the detection switch element, wherein, during irradiation, in a case where a change in a voltage supplied to at least one detection switch element of the plurality of the detection switch elements is performed, a change in a voltage supplied to a different detection switch element that is different from the at least one detection switch element is performed in an opposite direction to the change in a voltage supplied to the at least one detection switch element, or a change in a voltage supplied to the switch element is performed in an opposite direction to the change in a voltage supplied to the at least one detection switch element.

* * * * *